US009762392B2

(12) United States Patent
Carrer et al.

(10) Patent No.: US 9,762,392 B2
(45) Date of Patent: Sep. 12, 2017

(54) SYSTEM AND METHOD FOR TRUSTED PROVISIONING AND AUTHENTICATION FOR NETWORKED DEVICES IN CLOUD-BASED IOT/M2M PLATFORMS

(71) Applicant: EUROTECH S.p.A, Amaro (IT)

(72) Inventors: Marco Carrer, Udine (IT); Cristiano De Alti, Enemonzo (IT); Diego Rughetti, Rieti (IT); Antonio Abramo, Tavagnacco (IT); Stefano Adami, Volano (IT)

(73) Assignee: Eurotech S.P.A., Amaro (UD) (IT)

( * ) Notice: Subject to any disclaimer, the term of this patent is extended or adjusted under 35 U.S.C. 154(b) by 48 days.

(21) Appl. No.: 14/860,848

(22) Filed: Sep. 22, 2015

(65) Prior Publication Data
US 2016/0285628 A1   Sep. 29, 2016

Related U.S. Application Data

(60) Provisional application No. 62/138,708, filed on Mar. 26, 2015.

(51) Int. Cl.
*H04L 9/32* (2006.01)
*H04L 9/00* (2006.01)
*H04L 9/08* (2006.01)

(52) U.S. Cl.
CPC ............ *H04L 9/3228* (2013.01); *H04L 9/321* (2013.01)

(58) Field of Classification Search
CPC ............. H04L 61/1511; H04L 63/0428; H04L 63/0823; H04L 63/083; H04L 29/12066;
(Continued)

(56) References Cited

U.S. PATENT DOCUMENTS

2003/0051029 A1   3/2003   Reedy et al.
2003/0084177 A1   5/2003   Mulligan
(Continued)

FOREIGN PATENT DOCUMENTS

EP   1684169 A1   7/2006
EP   2360871 A1   8/2011
(Continued)

OTHER PUBLICATIONS

Logmein Xively; "API Docs: Provisioning."; Printed Aug. 19, 2014; pp. 1; https://xively.com/dev/docs/api/product_management/provisioning.
(Continued)

*Primary Examiner* — Catherine Thiaw
(74) *Attorney, Agent, or Firm* — Eschweiler & Potashnik, LLC

(57) ABSTRACT

Systems and methods for trusted provisioning and authentication for networked devices in a cloud-based IoT/M2M platform is disclosed. In one embodiment, a fully qualified domain name and public key is registered in a domain name server for each networked device during device configuration. A network device establishes its trustworthiness to a data collection and processing server by providing credentials to the data collection and processing server. The data collection and processing server deduces the username, the device's fully qualified domain name, and encrypted password from the credentials. The domain name server is queried for the fully qualified domain name and the public key is returned. The encrypted password is decrypted using the public key and an attempt is made to verify the password. When the password is verified, the username is provided to the data collection and processing server to authorize a network connection between the networked device and the data collection and processing server.

20 Claims, 16 Drawing Sheets

(58) Field of Classification Search
CPC ..... H04L 9/0866; H04L 9/321; H04L 9/3263; H04L 9/3228; H04L 9/006; H04L 9/4338
See application file for complete search history.

(56) References Cited

U.S. PATENT DOCUMENTS

| | | | |
|---|---|---|---|
| 2003/0097422 A1 | 5/2003 | Richards et al. | |
| 2004/0103312 A1* | 5/2004 | Messerges | G06F 21/10 726/10 |
| 2004/0260774 A1 | 12/2004 | Jensen et al. | |
| 2008/0288938 A1 | 11/2008 | DeHaan | |
| 2009/0253409 A1 | 10/2009 | Slavov et al. | |
| 2010/0100876 A1 | 4/2010 | Glover et al. | |
| 2011/0265158 A1 | 10/2011 | Cha et al. | |
| 2012/0083228 A1 | 4/2012 | Baumert et al. | |
| 2012/0317254 A1* | 12/2012 | Chekhanovskiy | H04L 61/1511 709/222 |
| 2013/0324121 A1 | 12/2013 | Kwon et al. | |
| 2014/0020061 A1 | 1/2014 | Popp et al. | |
| 2014/0052984 A1* | 2/2014 | Gupta | H04W 12/06 713/162 |
| 2016/0205078 A1* | 7/2016 | James | H04L 63/0442 713/171 |
| 2016/0205106 A1* | 7/2016 | Yacoub | H04L 61/1511 726/28 |

FOREIGN PATENT DOCUMENTS

| | | |
|---|---|---|
| KR | 20020046668 A | 6/2002 |
| WO | 2004045139 A2 | 5/2004 |
| WO | 2013120225 A1 | 8/2013 |

OTHER PUBLICATIONS

Logmein Xively; "API Docs: Activate a Device."; Printed Aug. 19, 2014; pp. 1-3; https://xively.com/dev/docs/api/product_management/devices/activate_device.

DIGI: iDigi Platform. "Device Cloud Overview."; Printed Aug. 19, 2014; pp. 1-4; redirected to Etherios.com/products/devicecloud/ from: http://www.idigi.com.

ILS: Devicewise. "Platform—Overview."; printed Aug. 19, 2014; pp. 1; http://www.devicewise.com/platform/overview.

Exosite: One Platform. "Provisioning Device Interaction."; printed Aug. 19, 2014; pp. 1-3; https://support.exosite.com/hc/en-us/articles/200293838-Provisioning-Device-Interaction.

Exosite: One Platform. "Provisioning Vendor Device Management"; printed Aug. 19, 2014; pp. 1-3; https://support.exosite.com/hc/en-us/articles/200293848-Provisioning-Vendor-Device-Management.

Exosite: One Platform. "Device Provisioning and Fleet Management."; printed Aug. 19, 2014; pp. 1-2; https://github.com/exosite/docs/tree/master/provision.

* cited by examiner

SYSTEM AND METHOD FOR TRUSTED PROVISIONING AND AUTHENTICATION FOR NETWORKED DEVICES IN CLOUD-BASED IOT/M2M PLATFORMS

CROSS REFERENCE TO RELATED APPLICATIONS

This patent disclosure claims the benefit of U.S. Provisional Application Ser. No. 62/138,708 filed on Mar. 26, 2015, which is hereby wholly incorporated by reference.

BACKGROUND

The provisioning of networked devices in machine-to-machine (M2M) or Internet of Things (IoT) applications is a complex task. Provisioning is the process during which a device, initially configured with a default factory configuration, is deployed in the field and activated. As part of the provisioning process the device receives the application code and configuration parameter values it needs to execute the application. The provisioning process can happen over-the-air as part of a post-production step. In the M2M context, provisioning is often applied to thousands of devices and is generally performed in the field while the device is connected to the Internet over-the-air. Provisioning often involves several entities including the device manufacturer, the application developer, the service provider, the device installer, and the ultimate client. Provisioning that actively involves multiple entities for networked device installation, configuration, and activation is referred to as "multi-tier" provisioning.

SUMMARY

In one embodiment, a method is provided for provisioning a networked device to enable and support authenticated access by the networked device to a data collection and processing server. A network connection is established with the networked device. A fully qualified domain name and a public key for the networked device is received from the networked device. The fully qualified domain name and the public key are registered with a domain name server (DNS). Configuration data, including data corresponding to a username, is transmitted to the networked device. The username enables the networked device to establish an authorized connection with a data collection server that is accessible, via a network, to the networked device. The networked device is now provisioned and ready to periodically connect to a data collection and processing server to download collected data.

Credentials are received from the networked device. The username, the fully qualified domain name, and an encrypted password are deduced from the credentials. A domain name server is queried. The DNS stores records mapping fully qualified device names to public keys for respective networked devices. A determination is made as to whether the public key is received from the domain name server. When a public key for the device is returned by the domain name server, the password is decrypted based, at least in part, on the public key. An attempt is made to verify the password and if the password is verified, the username is provided to a data collection server to authorize a network connection between the computing device and the data collection server. When the domain name server does not have a record recording a public key for the fully qualified domain name or the password is not verified, a connection between the networked device and the data collection server is not authorized.

In one embodiment, the method includes generating a shared secret key and transmitting the shared secret key to i) the networked device and ii) the data collection server. The shared secret key enables the networked device to establish an authenticated connection with the data collection server.

In one embodiment, the method includes establishing an authenticated connection with the networked device by transmitting a public key for the computing device to the networked device.

In one embodiment, the method includes accessing data corresponding to requests for provisioning for respective computing devices and when there is no request for provisioning for the computing device, refraining from transmitting the configuration data to the networked device.

In one embodiment, the method includes receiving, from an installation device that is different than the networked device, a request to activate the networked device; and in response to the request, establishing the network connection with the networked device such that the installation device does not receive data transmitted via the network connection.

In one embodiment, the method includes generating the shared secret by generating a random number. In one embodiment, the method 1500 includes receiving the shared secret from the networked device.

In one embodiment, the method includes deducing the fully qualified device name as a predetermined portion of the credentials, where the fully qualified domain name uniquely identifies the networked device.

In one embodiment, the method includes attempting to verify the decrypted password by: extracting a first secret key from the decrypted password; accessing memory storing respective secret keys mapped to respective networked devices; selecting from the memory a second secret key corresponding to a shared secret key mapped to the networked device; comparing the first secret key to the second secret key; and when the first secret key matches the second secret key, determining that the decrypted password is verified.

In one embodiment, the method includes attempting to verify the password by: receiving, with the encrypted password, a signature computed by the networked device using a private key of the networked device and the password; attempt to verify the signature based on the public key; and when the signature verifies based on the public key, determining that the decrypted password is verified.

In one embodiment, the method includes, when the domain name server does not have a public key for the fully qualified domain name, invoking a certificate revocation policy to revoke a record associated with the fully qualified device name from the domain name server.

In one embodiment of the method the querying of the domain name server, the registering of the fully qualified domain name and the public key, and the receiving of the public key are performed in accordance with DNSSEC protocol.

In one embodiment, a computing system includes a provisioning server and a data collection server. The provisioning server includes configuration logic configured to: establish a network connection with a networked device; receive, from the networked device, a fully qualified domain name and a public key for the networked device; register the fully qualified domain name and the public key with a domain name server; and transmit configuration data, including data corresponding to a username, to the networked device. The username enables the networked device to establish an authorized connection with a data collection server that is accessible, via a network, to the networked device.

The data collection server includes authentication and authorization logic configured to, in response to receiving credentials from the networked device: deduce, from the credentials, the username, the fully qualified domain name, and an encrypted password; query the domain name server for a public key mapped to the fully qualified domain name; when the domain name server does not have a record recording a public key for the fully qualified domain name, refrain from providing the username to the data collection server such that no network connection will be established between the computing device and data collection server. When a public key for the device is returned by the domain name server the authentication and authorization logic is configured to decrypt the encrypted password, based at least in part, on the public key; attempt to verify the decrypted password; and when the decrypted password is verified, provide the username to a data collection server to authorize a network connection between the computing device and the data collection server.

BRIEF DESCRIPTION OF THE DRAWINGS

The accompanying drawings, which are incorporated in and constitute a part of the specification, illustrate various systems, methods, and other embodiments of the disclosure. The illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Existing provisioning solutions support a third party installation contractor role by providing limited access to the platform content. This requires the definition, management, and maintenance of an installation contractor specific user profile for each installation contractor. Providing even limited access to platform content can compromise platform security.

Other provisioning solutions generate and manage (device ID, activation key) pairs and allow activation of a device using the proper (ID, key) pair. When a third party installs devices in this scenario, the platform content is exposed to security issues caused by lack of monitoring, verification and auditing of the installation process. For example, in these scenarios, an agreement between the customer and the installation contractor is not tracked by the provisioning process, meaning that stolen devices can be activated by anyone with the (ID, key) pair for the device. Further, the customer may need to provide proprietary data such as local network configuration information to unknown installation contractor personnel.

Some provisioning solutions require that, prior to activation, the networked devices have an out-of-the-box preliminary configuration prior to in-field deployment. This out-of-the-box approach requires that the installation contractor know all the initial configuration settings and manually set the configuration directly or through a configurator device. Allowing an installation contractor to have knowledge of the configuration settings introduces security issues and the manual entry of settings is prone to errors.

Figure 1:
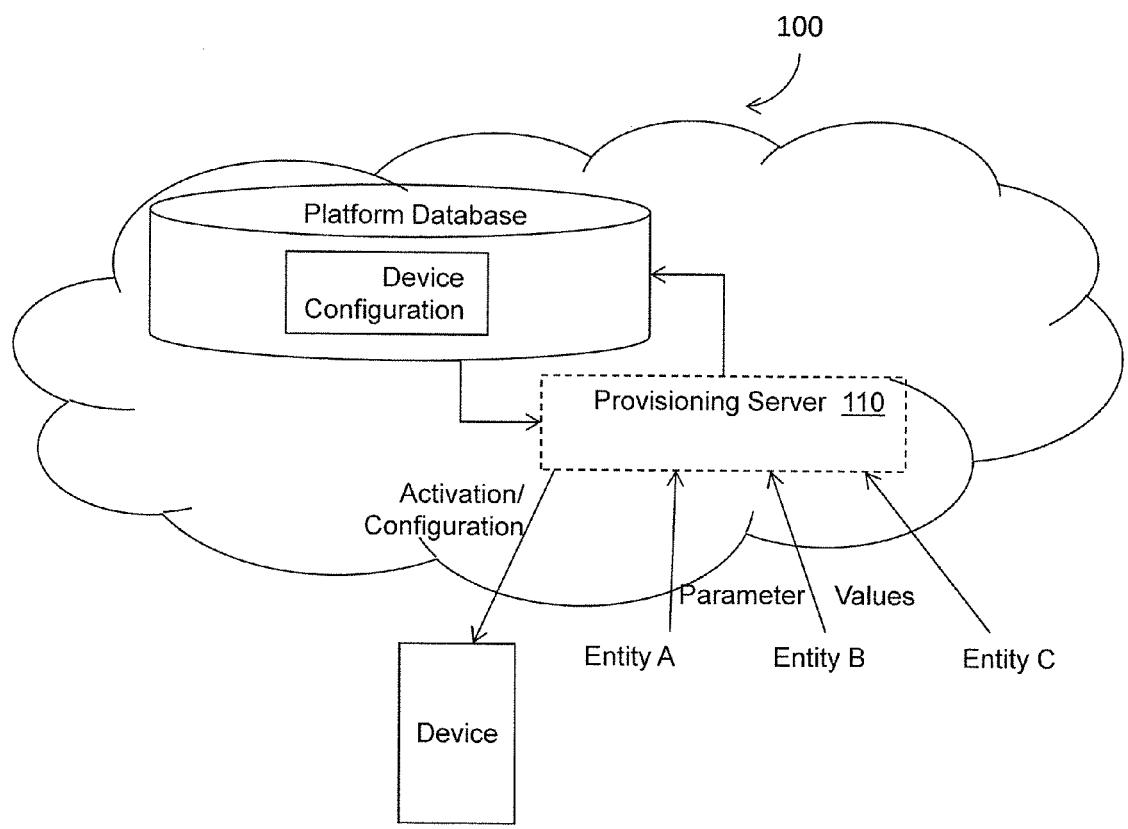
FIG. 1 illustrates one embodiment of a system associated with secure cloud based multi-tier provisioning.

Described herein are example devices, methods, and other embodiments associated with secure cloud based multi-tier provisioning. FIG. 1 illustrates one embodiment of a provisioning system 100 in which a provisioning server 110 is used to securely provision a cloud-enabled networked device. The cloud-enabled networked device can be any device or appliance that collects data and sends the data to a cloud-based platform that archives and analyzes the data. The platform may also remotely control the device. The device may collect data using sensors, cameras, meters, and so on. The device may be a "black box" with multiple input and output interfaces and an internal processor capable of running an installed application that processes data obtained through the input interfaces and outputs data through the output interfaces. Data collected by the device may be transmitted to a cloud platform for long term storage in a database.

The provisioning server 110 provides a process to securely provision the device for multi-tier deployment scenarios in which each entity (e.g., entities A-C) at each tier defines, controls, and manages only his pertinent information while the cloud based provisioning server 110 monitors, verifies, and guides the device activation process. Entities authorized by the provisioning server 110 are allowed to define, manage, and access configuration parameters for which they are responsible, while entities are prevented by the provisioning server 110 from accessing the configuration parameters for which they are not responsible. The configuration parameter values are injected directly into the networked device after pre-activation by an authorized installation contractor. The configuration parameter values can be collected over a period of time by the various entities in the secure manner described below and kept separate from the networked device until the time of activation. The configuration parameter values are stored in the platform database until they are communicated to the device at installation time. This reduces the chance of unauthorized activation of the networked devices for other than their intended purpose.

For the purposes of this description the term "configuration parameter" is used broadly to entail any provisioning information and software that is used by the networked device to provide a designated service. Configuration parameters include application settings, operating system settings, networked device settings, networked device input/output interface settings, and so on. In this description, the term configuration parameter may also include the application binary itself. A "configuration parameter value" refers to a specific instance of a "configuration parameter." For example a configuration parameter "minimum operating voltage" may have a configuration parameter value of "2 V DC" in one instance and a configuration parameter value of "10 V DC" in another instance. Configuration parameters include "static" configuration parameters that are independent of the device's installation site as well as "dynamic" configuration parameters that are not determined until installation. Values for the dynamic configuration parameters will usually be input by the installation contractor. Dynamic configuration parameters may be site or installation dependent (e.g., final location of the device, information about the building where the device is installed, language preference, and so on).

Figure 2:
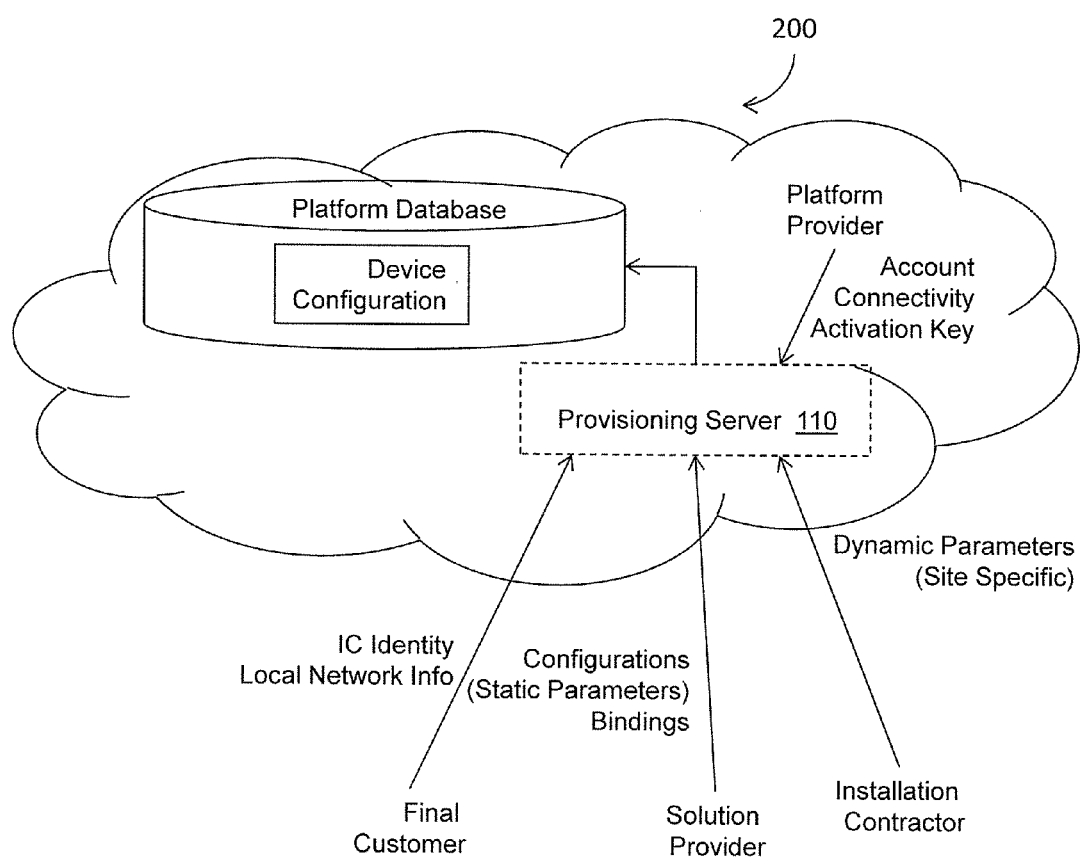
FIG. 2 illustrates the system of FIG. 1 collecting configuration parameters for various entities.

FIG. 2 illustrates one embodiment of a secure cloud based multi-tier provisioning system 200 in which various configuring entities provide various configuration parameter values to the provisioning server 110. In the following document, several entities are referenced that are involved in one example of a typical provisioning process. The entities include a 1) platform provider (DPP) that may also be the manufacturer of the device, 2) a solution provider (SP) who is usually the entity who develops the application and/or the vendor of the service provided by the networked device, 3) an installation contractor (IC) who installs and activates the device in the field, and 4) the final customer (FC) who pays the SP for the service provided by the networked device. While these specific entities will be referenced throughout this document, in some embodiments, a subset of these entities and/or other different entities are involved in the provisioning process.

The DPP is a vendor offering a cloud-based platform to which the networked devices connect to provide remote device management, data collection, and transmission. One of the features offered by the DPP platform is a device configuration container which holds and manages configuration information provided to the networked devices during provisioning. The DPP supplies a provisioning agent application that is installed in the device during initial setup. The provisioning agent runs on the device and allows any type of hardware to be provisioned using the process described herein. Configuration parameters that may be set by the DPP include an account for which the device is registered, connectivity information used by the device to connect to the provisioning server 110, and an activation key that, when received, will trigger activation of the device.

The SP is a solution provider who builds an application for the final customer. The application leverages the device and platform. In a pre-deployment phase, the SP develops the application requested by the FC and sets up the device configuration container according to the application's needs. The SP may develop several configurations that can be used by devices based on their end use. The configurations are stored in the platform database. The SP binds particular devices to particular configurations. A device's specific configuration will be installed in the device configuration container for the device. Sometimes, the SP is the FC. For example, customers with software development skills can build applications over the DPP products. While the model presented herein keeps these two roles separate, the entities taking on these roles can overlap.

The FC or SP delegates to an IC the task of physically deploying and installing his device in the field. To this end, the FC provides the provisioning server 110 with the identity of a designated IC. The FC also provides local network information that will allow the device to join a local network in the location where the device is being installed. As will be described in more detail below, in some embodiments the provisioning server 110 may prevent the IC from reading this local network information.

The IC deploys the devices at an end user site designated by the FC. The IC locally initializes the device with the local network information from the provisioning server. The IC sets dynamic configuration parameter values in the device configuration container and requests activation of the device from the provisioning server.

As shown in FIG. 1, during activation, the provisioning server 110 pushes the configuration parameter values from the device configuration container directly to the networked device (not through the IC). The networked device automatically configures itself based on the configuration parameter values it received and starts execution of the application. The IC verifies that the activation and provisioning was successful. The various embodiments described herein separate the concerns of the roles of the different entities involved in the provisioning process so that a "least privilege" security principle is maintained throughout the provisioning process.

Figure 3:
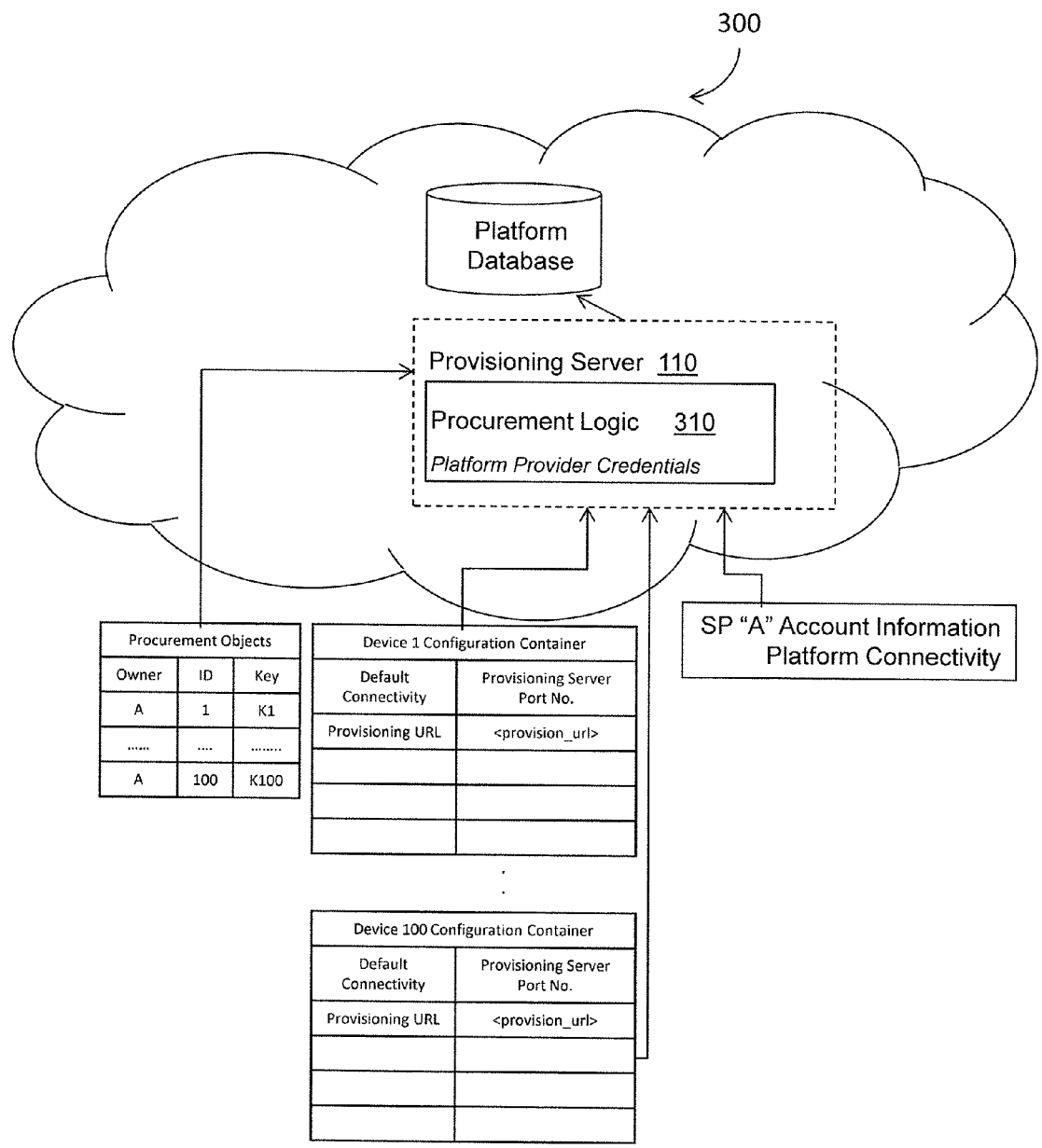
FIG. 3 illustrates one embodiment of a system associated with secure cloud based multi-tier provisioning creating procurement objects and configuration containers.

FIG. 3 illustrates one embodiment of a provisioning system 300 performing initial steps in provisioning a cloud enabled networked device (not shown). The networked device is produced by the DPP and is imaged with default software which contains the URL and credentials necessary to connect to the provisioning server 110. All devices produced by the DPP can have this same initial software and URL, there is no need to customize the default device image based on the final customer or service provider. Each device has a unique identification code (ID). For example, the ID can be derived or computed from device-dependent hardware specific information. The ID is stored in device resident computer storage medium so that it is accessible to software and also labeled on the device's enclosure.

The provisioning server 110 includes procurement logic 310. The procurement logic 310 is configured to create a procurement object for the device. The procurement logic 310 enforces platform provider credentials, meaning that only the DPP can create or access the procurement object. When an SP orders a quantity of devices, the procurement logic 310 creates an account for the SP. The procurement logic 310 registers each device purchased by the SP to the SP account. The procurement logic 310 also generates an activation key for the devices.

In some embodiments, a unique activation key is generated for each device while in other embodiments, the same activation key may be assigned to multiple devices. The activation key may be configured to expire after a certain period of time. The SP may be prevented from reading the activation key. The procurement logic 310 also creates a broker account through which the device will provide collected data to the platform during normal operation and associates configuration parameter values related to platform connectivity for the broker account with the SP's account.

A procurement object for a device includes the device's owner (e.g., SP), the device's ID, and the activation key that has been assigned to the device. FIG. 3 illustrates procurement objects for devices 1-100 which have been registered to SP "A". A device configuration container is created for each device, which at this point in the provisioning process contains default connectivity information as well as the URL that can be used to connect with the provisioning server 110. The procurement objects and device configuration containers are stored in server side computer storage medium (e.g., the platform database). Access to the computer storage medium is controlled at all times by the provisioning server 110.

Figure 4:
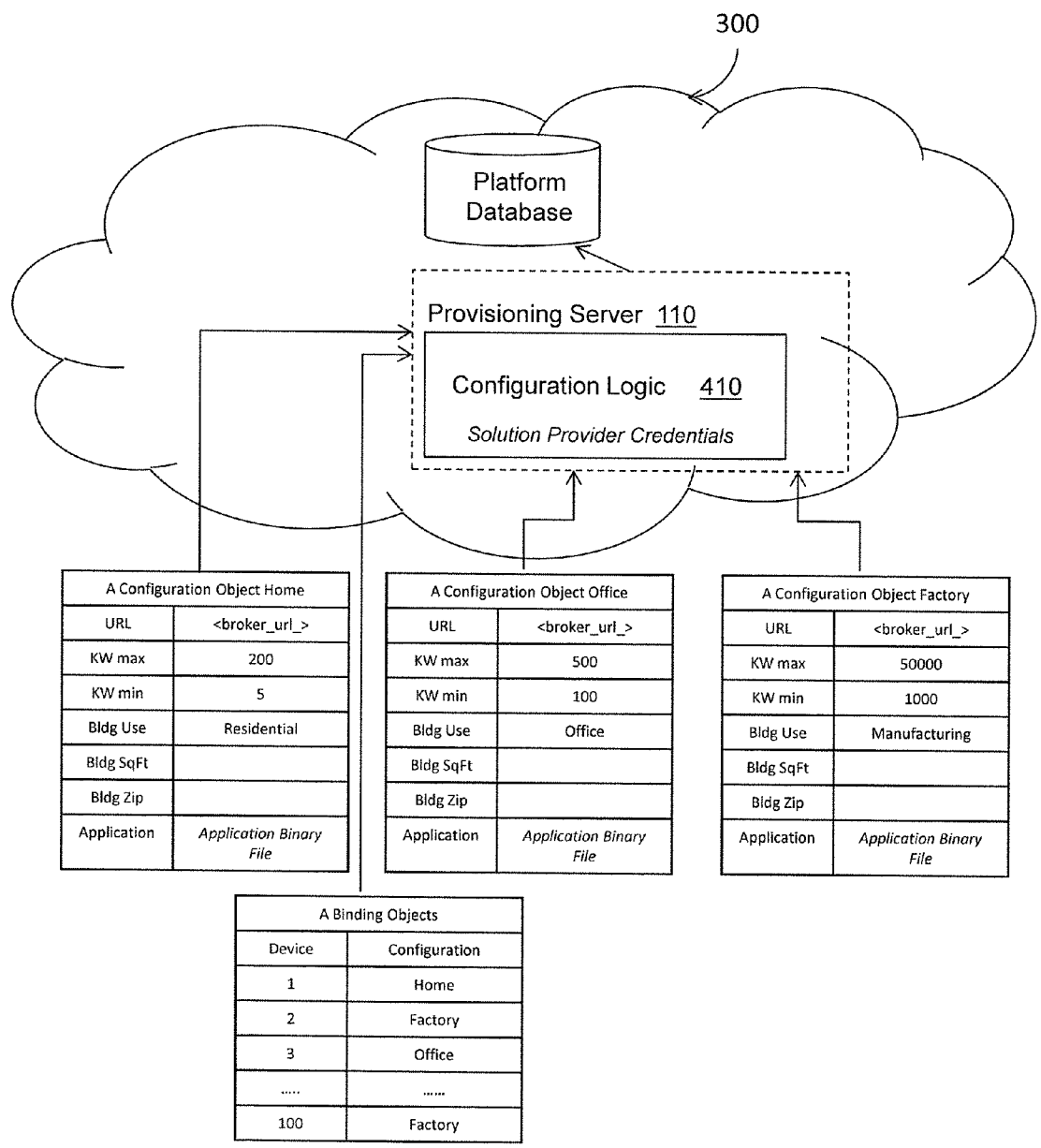
FIG. 4 illustrates the system of FIG. 3 creating configurations and binding objects.

FIG. 4 illustrates the provisioning system 300 in a next stage of the provisioning process. The provisioning server 110 includes a configuration logic 410 that allows the SP to create configuration objects that seed the configuration parameter values that will be provided to the devices during activation and deployment. The configuration logic 410 enforces SP credentials during creation of the configuration objects. The configuration logic 410 provides an extensible configuration template (created by the platform provider) that allows the SP to capture configuration parameters including, for example: connection parameters (URL and credentials for the broker account) that the device needs to connect to the platform during normal operation, static configuration parameters and their default values, dynamic parameters whose values will be provided by the IC during device activation, and one or more application binaries that will be installed on the device. The application binaries rely on the configuration parameter values in the configuration object to adjust the application's run time behavior to the specific characteristics of the environment in which is deployed.

Depending on the heterogeneity of the devices being deployed or the topology of the deployment, any number of configuration objects may be created by the SP and stored in the platform database. For illustrative purposes only, configuration objects are shown that might be used to configure networked devices that will be used as electrical power meters being purchased by metering solution provider (SP) and provided for use by a utility company (FC). Three configuration objects are created by the SP using the configuration template: a home configuration object, an office configuration object, and a factory configuration object. Each configuration object includes four static configuration parameters: URL, a maximum KW, a minimum KW, and a building use. Each configuration includes different values for these static configuration parameters. Two dynamic configuration parameters are included in the configuration objects: building square footage and building zip code. However no values are stored for these parameters because the values will be provided by the IC at device activation.

The configuration logic 410 also creates binding objects that map each registered device to one of the configuration objects. The binding objects allow the SP to identify which configuration is to be applied to each registered device and to easily change a device's configuration by changing a single value in the binding object. The binding objects are stored in the platform database. The provisioning server 110 controls access to the configuration objects and binding objects so that the IC and FC may not read the configuration objects or binding objects. Note that the configuration objects can be created and modified over a period of time, independent of the physical location of the devices themselves, meaning that the devices can be shipped before, during, or after creation of the configuration objects.

Figure 5:
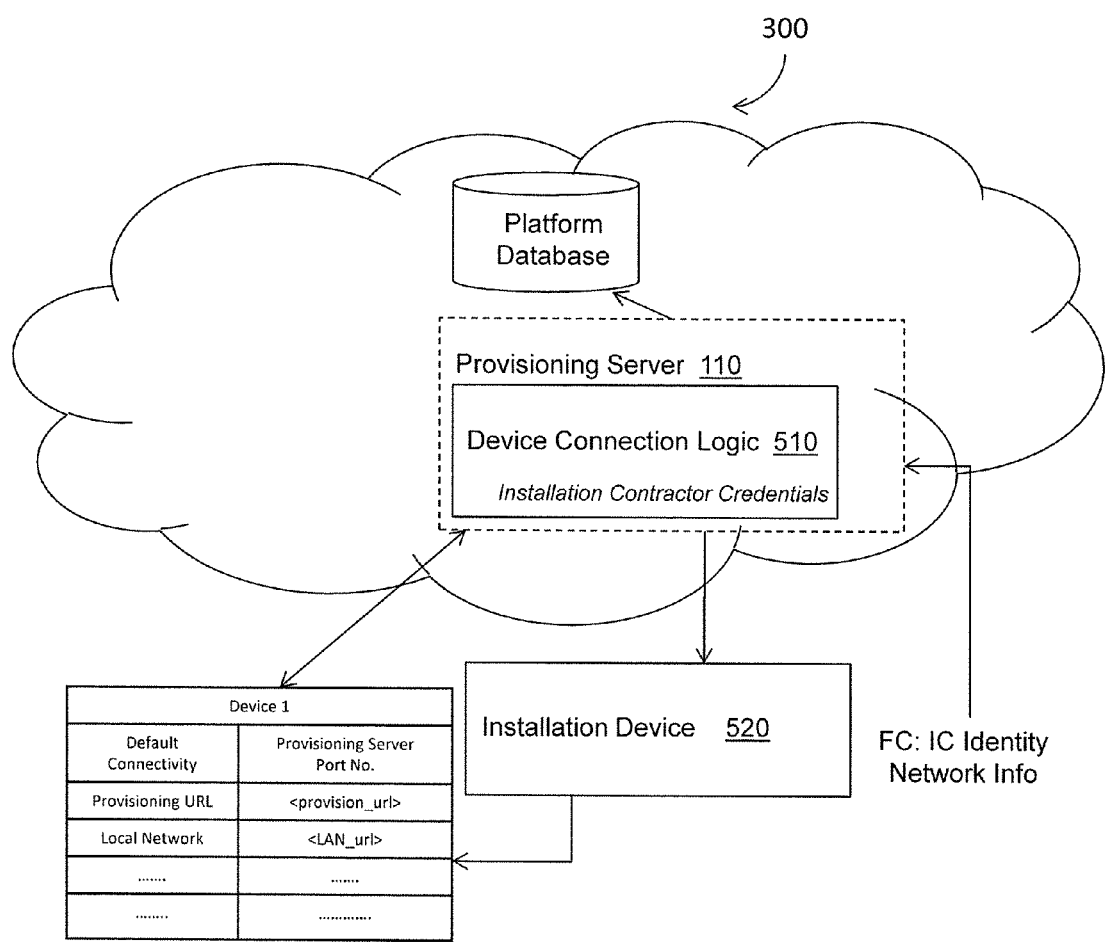
FIG. 5 illustrates the system of FIG. 3 installing local network configuration information on a networked device.

FIG. 5 illustrates the provisioning system 300 in a next stage of device provisioning. The provisioning server 110 includes a device connection logic 510 that is configured to interact with an installation device 520. In one embodiment, the installation device is a smart phone or other portable networked device that is running an installation application and is connected to the provisioning server 110 by way of the Internet and to the networked device through a local proximity link and protocol (typically wireless, e.g., Bluetooth, WiFi, NFC, and so on). The IC is at the installation site and is in possession of the device and the installation device. To activate the device, the only information the IC needs is the ID of the device and the account (SP) to which the device is registered.

The device connection logic 510 is configured to provide the FC with limited access to the provisioning server 110 to identify the IC that will be performing the installation and to record local site configuration parameter values that will be needed during installation. The local site configuration parameters include local network configuration information that the device will need to connect to the local network and thereby access the Internet. The local site configuration parameter values are stored in server side computer storage medium (e.g., platform database) and the provisioning server 110 prevents access to the local site configuration parameter values by the IC (and, optionally, the SP).

To enable the Internet connection in the device, the IC logs in to the provisioning server 100 using credentials that identify the IC as the same IC that was designated by the FC above. The IC provides the ID of the device (which can be found on the device's label) and the name of the account to which the device is registered. If the provided information matches the device's procurement object, the provisioning server 110 transmits the local site configuration parameters to the installation device 520, which applies the local site configuration parameters to the device. The device responds by establishing an Internet connection with the provisioning server 110 by way of the local network. Note that the local site configuration parameters were not exposed to the IC during this step, but rather were transferred to the device through the installation device. The device now enters a "waiting for activation" state.

Figure 6:
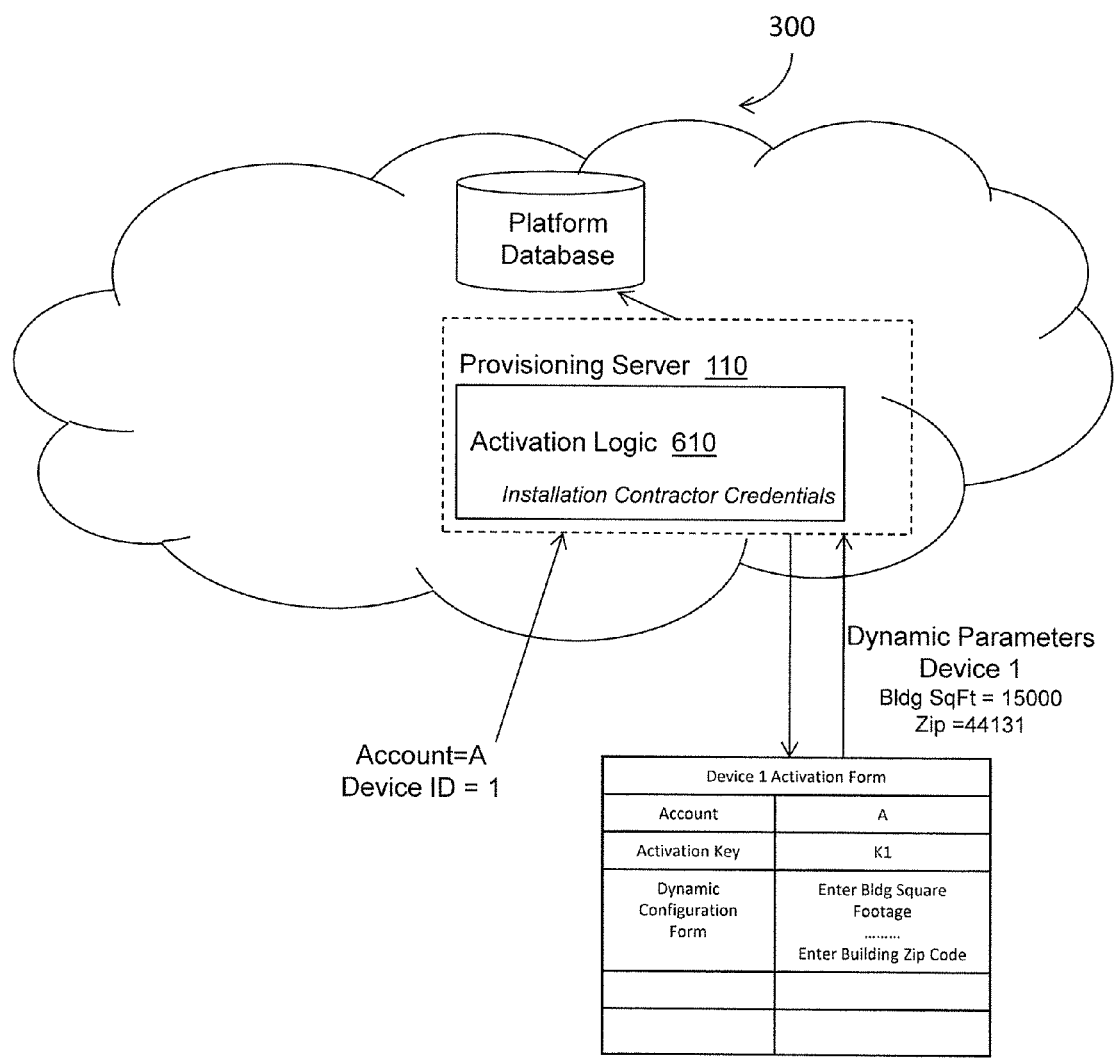
FIG. 6 the system of FIG. 3 creating an activation form for the networked device.

FIG. 6 illustrates the provisioning system 300 in a next stage of device provisioning. The provisioning server 110 includes activation logic 610. During activation, the provisioning server 110 enforces installation contractor credentials such that only the authorized IC can perform activation. Once the device is connected to the Internet, the activation logic 610 provides an activation form for the device to the IC to be filled in to activate the device. The activation form includes the account name, the activation key for the device, and a dynamic configuration form that allows the IC to input the dynamic configuration parameter values for the device.

In the example shown in FIG. 6, the dynamic configuration parameters include building square footage and building zip code. The IC uses the form to provide values for the dynamic configuration parameters (e.g., 15,000 square feet and 44131). The activation logic 610 creates an activation object for the device that includes the dynamic configuration parameter values and the device ID. The dynamic configuration parameter values are also stored in the platform database as part of the device's configuration container.

Figure 7:
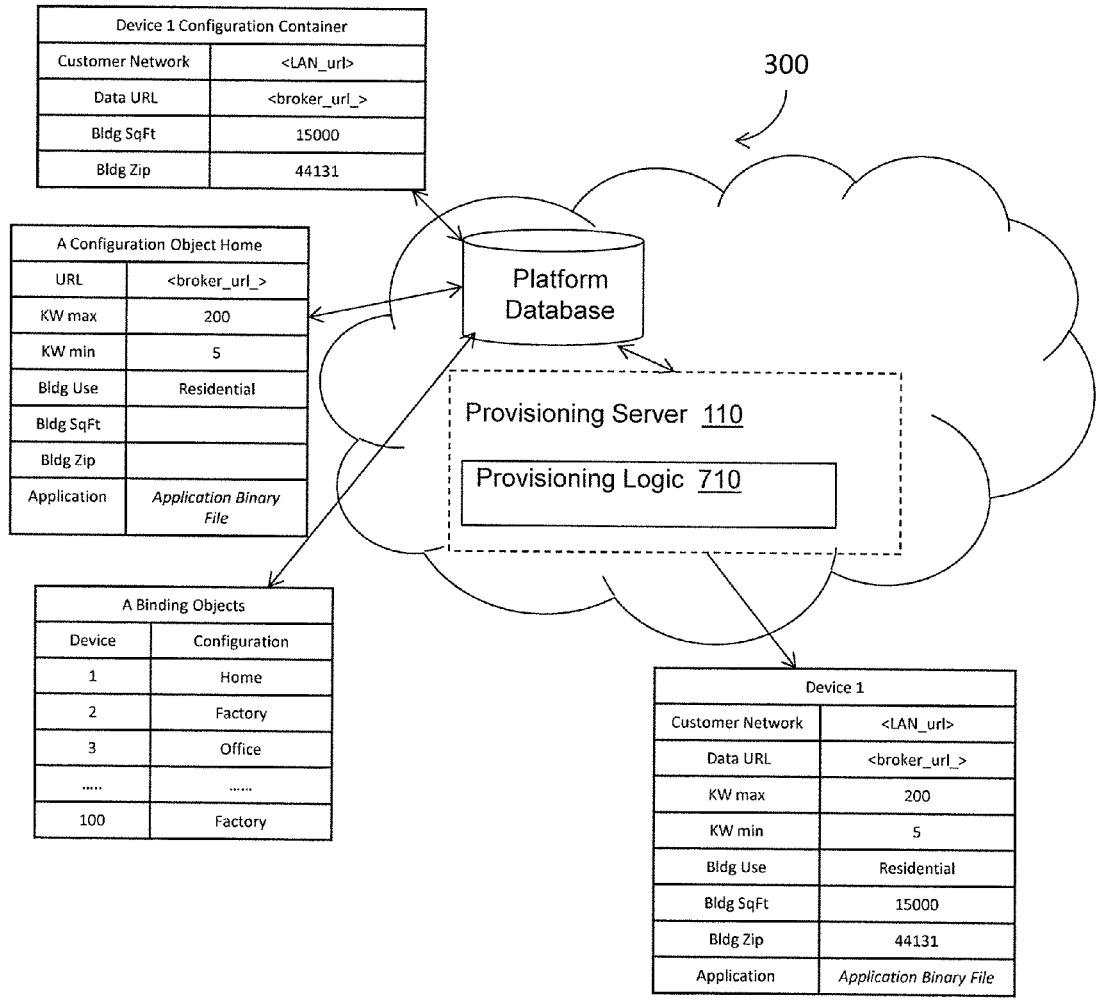
FIG. 7 illustrates the system of FIG. 3 provisioning the networked device.
Figure 8:
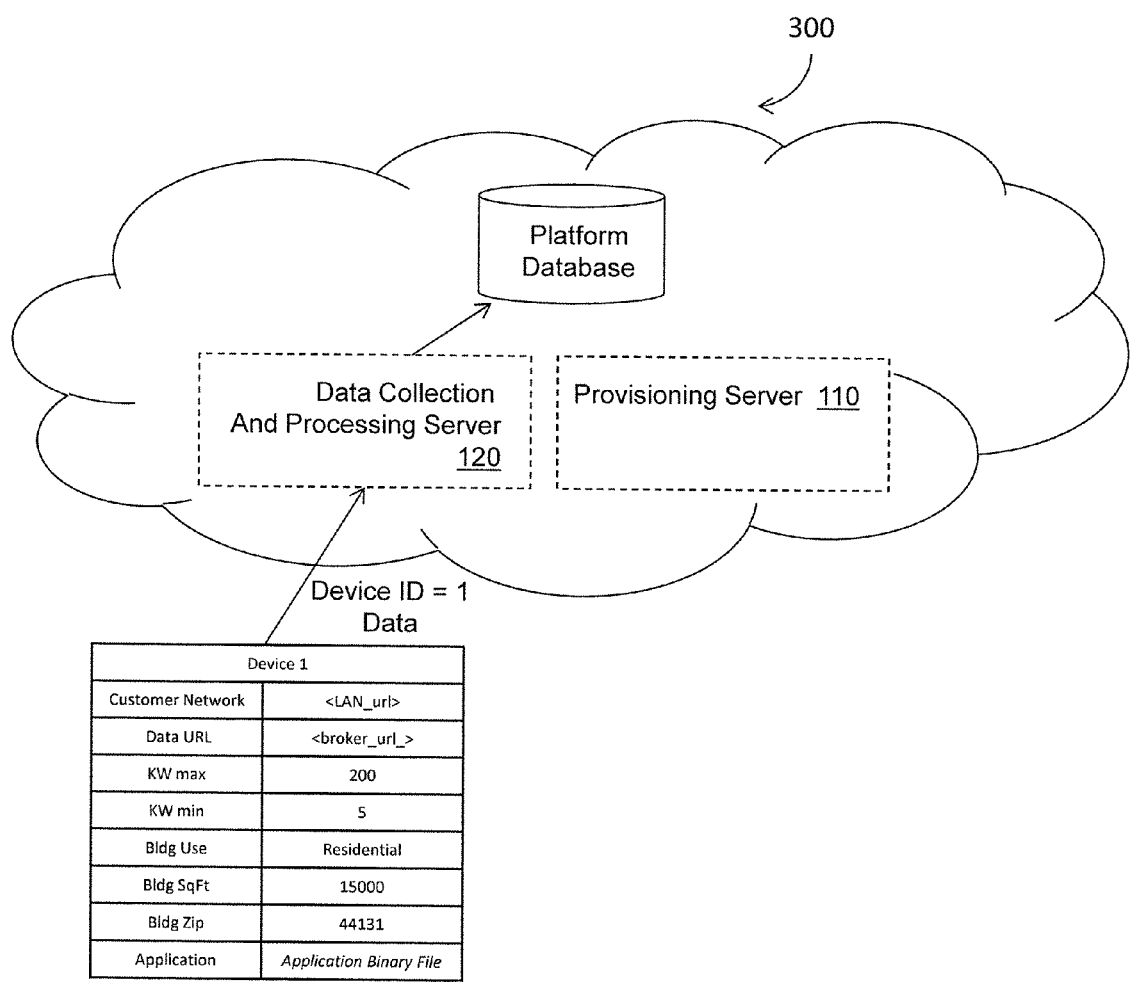
FIG. 8 illustrates the system of FIG. 3 providing data to the cloud based platform.

FIG. 7 illustrates the provisioning system 300 in a next stage of device provisioning. The provisioning server 110 includes provisioning logic 710 that automatically (i.e., without further intervention from the IC) provisions the device. The provisioning logic 710 traverses the binding objects to determine which configuration object is bound to the device ID. The static configuration parameter values and the dynamic configuration parameters are resolved and the final configuration for the device, including the application binary, is packaged by the provisioning logic 710 for transfer to the device. The provisioning server 110 contacts the device with the ID in the activation object and sends the device configuration and application binary from the device's configuration container to the device. The device verifies the provided data and configuration and disconnects from the provisioning server 110. The device applies the configuration and starts the provisioned customer application and configuration as shown in FIG. 8. The device now communicates with a data collection and processing server 120 that is configured to collect, analyze, and store the data collected and transmitted by the networked device during normal operation. For example, when the device is used as an energy meter, the data from the device can now be used to compute the mean kilowatt consumption per hour for a building in which the device is installed.

As can be seen from the above description with reference to FIGS. 3-8, the secure cloud based multi-tier provisioning process provides many benefits. For example, a stolen device cannot be activated for another account without proper IC credentials, an activation key, and a reconfiguration at the DPP level. A stolen activation key cannot be used to activate devices belonging to another account. The IC cannot see or access the FC local network configuration information at any point in the process. The IC cannot see or access the configuration parameter values provided to the device by the provisioning server. The provisioning process described above allows shipment of devices directly to the installation site without first shipping the devices to the SP. The IC is provided with the activation codes once the IC is validated for activating the devices. Thus, the only time the activation code and the device are in the same place is at the installation site during activation, minimizing the possibility of security issues.

In one embodiment, the application binary may be included in the initial software image installed in the device at the factory. In this case, the application binary is not part of the configuration that is transmitted during provisioning. In another embodiment, the application binary is an installation application. Provisioning configures the device and provides access to the platform. After provisioning the running installer will access the platform to download the final application. This allows development work on the application to continue beyond the provisioning process.

In one embodiment, the SP can enable the FC account as soon as the related device configurations are established. In another embodiment, when the SP provides the IC with devices, this operation is recorded by the platform. The platform will then automatically enable the FC account within a provided deployment time window. The FC deployment requires low access rights to the platform. The FC needs only to provide the IC identity and the local site parameters (e.g., local network configuration). When the IC arrives in the field, the FC records his identity (e.g., personal information or company ID). If the SP has already recorded an IC list, the platform will verify the IC. The FC provides the platform with the local network configuration to enable WAN access to the deployed device. The platform will check this configuration.

By providing the FC with the (ID, Activation key) list, the platform can provide a strong check on each device in the hands of the IC by checking each device ID and emitting the corresponding activation key. On confirmation of the device list, the platform will enable the installation console, which provides anonymous access, for configuration and activation.

In one embodiment, the installation device can be a wireless terminal provide by the FC or C having two independent wireless interfaces. While the first interface will be already configured (by the installation device owner) to enable Internet access, the interface will be compatible with the device wireless interface (e.g., Wi-Fi, Zigbee, and so on). The IC will use the first wireless interface to connect to the installation console. This access will run a client application for device pre-activation.

The IC provides the device ID to the console. The platform records the attempted pre-activation for the specific installation device (e.g., by calculating a unique ID form the installation device's hardware information). The client application configures the second wireless interlace with a device compatible factory reset configuration to enable wireless communication with a generic device. The client application tests the device's local communication channel. For example the device reset-configuration state for an 802.11 wireless enabled device can use a DHCP mechanism to connect a predefined DHCP server on the installation device. In another embodiment, the device can perform a default out-of-reset sleep state exit in response to a broadcast message from the installation device. The client application configures the device's wireless interface with the device's information to enable WAN access, specifically to the provisioning server (e.g., the address and access credential information already stored in the device during the production). This approach allows an automatic pre-activation process without any IC intervention.

In one embodiment, the provisioning server can verify the successful connection for the device under pre-activation. The pre-activation step should be performed on the installation site to check the real local network connectivity so that problems due to wireless coverage, masking, and so on can be identified and resolved. The installation console informs the IC and records the pre-activation for the device by the identified installation device. The provisioning server then enables the activation console. The device verifies the connection with the provisioning server and goes to a low power mode "waiting for activation" state. This state may prevents any device activity to preserve battery life or may allow some interaction with the provisioning server. The installation console closes and automatically moves the installation interface to the activation console with the known device ID. The IC can finalize the activation process or postpone it.

The IC finally activates an installed device access the activation console in the platform. He can use the installation device or any other terminal device provided with network access to the platform. The IC enters the device Id to activate the device, using an anonymous access level. The platform verifies any provided dynamic parameters. If the dynamic parameters are acceptable, the platform enables the activation key input. The platform verifies the ID, activation key pair and can optionally enable an "activate now" button.

In one embodiment, the provisioning server contacts an activated device that is waiting for provisioning and they negotiate a secure channel. If the channel is established, the provisioning server sends the configuration parameter values to the device. In the case of an error during the provisioning process the device can provide visual feedback to the IC and notification to the provisioning server when possible. For example an LED may blink and/or the activation application running on the installation device may provide an alarm. If the provisioning operation fails, the device will not apply the new configuration and it will fall back to the waiting for activation mode. The IC can test the device and repeat the activation procedure, eventually in a specific test mode where the activation and provisioning process provides extensive logging and testing. When errors occur while the provisioned configuration is being applied or the application binary is being executed, the device can provide visual feedback to the user about the error. If the device can automatically reload to factory reset configuration plus the last local network configuration, it can re-connect to the provisioning server and interact with the IC through the IC client terminal. Otherwise the IC may manually command a factory reset to the device and restart the full deployment process. When the provisioning operation succeeds the device will be recorded as activated on the platform and the device will start executing the application code.

Figure 9:
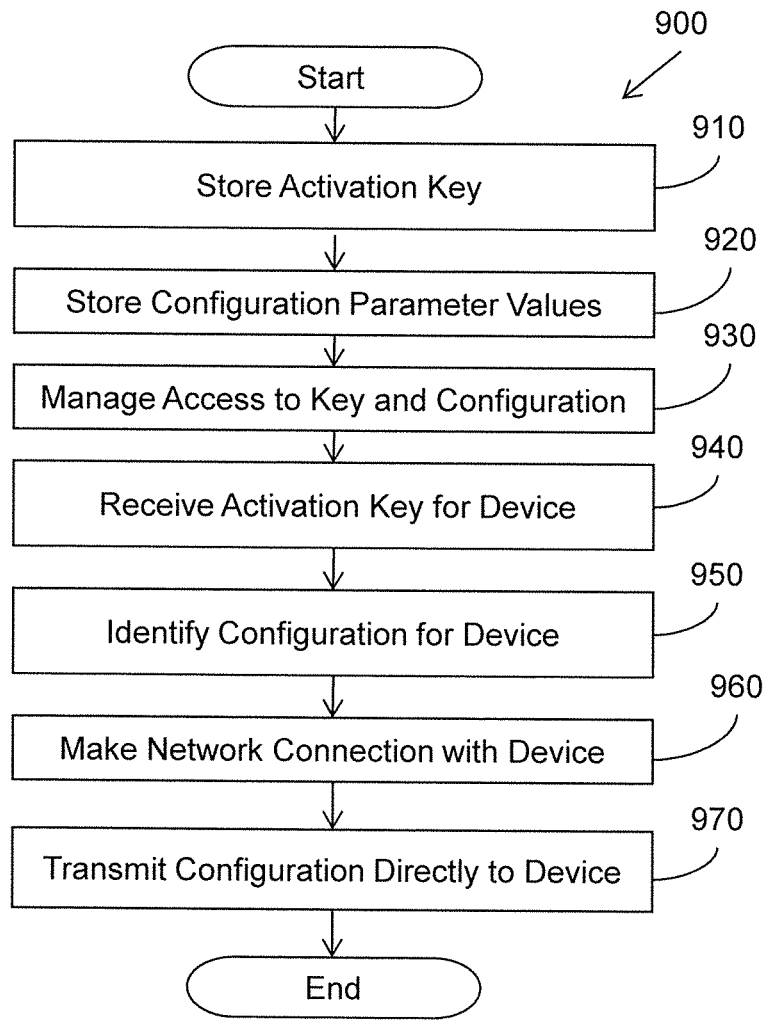
FIG. 9 illustrates one embodiment of a method for performing secure cloud based multi-tier provisioning.

FIG. 9 illustrates one embodiment of a method 900 for performing secure cloud based multi-tier provisioning. The method includes, at 910, storing, in server-side computer storage medium, an activation key for a networked device. At 920, the method includes storing, on the server, a set of configuration parameter values associated with an application to be run by the networked device. At 930, the method includes managing access to the computer storage medium such that access to the activation key and the configuration parameter values by unauthorized entities is prevented. At 940, the method includes receiving the activation key from the authorized installation entity, and at 950, identifying a configuration for the networked device comprising the set of configuration parameter values. The method includes, at 960, making a network connection with the networked device. The method includes, at 970, transmitting the configuration to the networked device, such that the configuration is not provided to the authorized installation entity.

Secure Configuration and Deployment of Networked Devices

To deliver open standards based infrastructure and services to allow devices, gateways and IoT, platforms perform mutual/two-way strong authentication at IoT scale (billions of end devices). The PKI-based approach is a trusted, well established mechanism for authentication and encrypting data in motion. PKI (Public Key Infrastructure) is an essential component for securing IoT communications over the Internet and Web, providing support for device/service authentication and encryption of data in motion. The PKI-based approach needs Certification Authority (CA) chains to bind the public key with the real identity and so ensuring trustworthiness of the certificates. This approach has known limitations on scalability, certificate revocation and service cost.

Other methods of certification exist that aim to overcome the CA chain related limitation. In particular, using security extensions to DNS (Domain Name Server protocol) it is possible to overcome the CA chain limitation, by using DNSSEC (a secure extension of DNS) and DANE (DNS-based Authentication of Named Entities) as means for assuring the authenticity of PKI certificates. For example, the DNS provides one root as trust anchor. Using DNS+DNSSEC is a one way to one map to PKI without the pain of intermediary CAs. DANE provides secure communication at transport, session and presentation OSI layers, for example on TLS/SSL protocol suite. These mechanisms necessitate significant changes for existing IoT platforms that do not have secure Authentication and Authorization. This is true in particular for standard access control list (ACL)-based systems (using a username/password couple).

The methods and systems described herein provide the IoT Platform and related connected devices with i) two way strong authentication and authorization functionality that is compatible with existing ACL-based systems and ii) integrated multi-tier provisioning for high assurance verification of the connected devices.

The described provisioning system and method is applicable to any M2M/IoT application provided with a provisioning server and a related provisioning system to securely configure and deploy networked devices to interact with a data collection and processing server (also serving as messaging server or broker). The provisioning system provides a step of verification of the binding between the provisioning server (PS) and the networked device (ND) (usually from a third-party authority). In a following provisioning step the PS applies configuration information for the specific ND that is connected on the public Internet network. In addition, a specific authentication and authorization step is performed by the ND on the data collection and processing server every time the ND needs to access the platform.

The described provisioning system provides a stronger authentication and verification mechanism for a ND when connecting to the data collection and processing server, without relying on fragile and hard to maintain username and password credentials. The provisioning system allows for a hardware based identification scheme of the ND and easy management and revocation of a compromised ND and its identity. The provisioning system supports retrofitting of the new secure authentication in existing protocols based on username/password credentials without requiring protocol changes or changes in the implementation of the networking stack like SSL.

Figure 10:
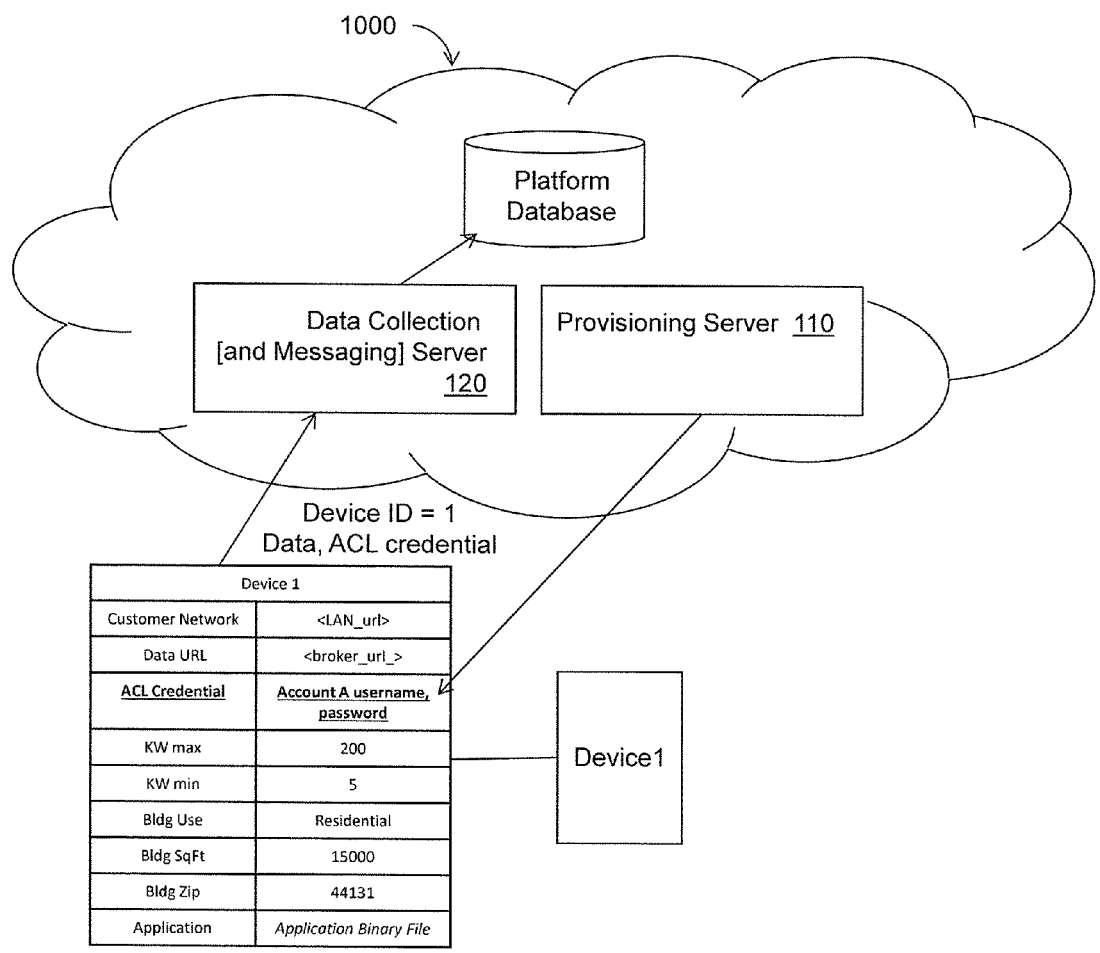
FIG. 10 illustrates one embodiment of a cloud based provisioning system that provides strong authentication and authorization for provisioning and data collection.

For the purposes of this description, reference will be made to the multi-tier provisioning system described above with reference to FIGS. 1-9. In the FIGS. 10-16, new components and functions with respect to the system of FIGS. 1-9 are highlighted in bold and underlined for clarity. Referring to FIG. 10, an overview of the supported IoT platform architecture is illustrated. It can be seen that the networked device is configured with a username and password associated with a given solution provider (SP) account A. The networked device uses the username and password to establish its authority and authenticity in order to gain permission to establish a network connection with a data collection and processing server. Note that the networked device employs a standard ACL based access technique to gain access to the data collection and processing server 120, meaning that no significant modifications to a legacy data collection server need be made.

Figure 11:
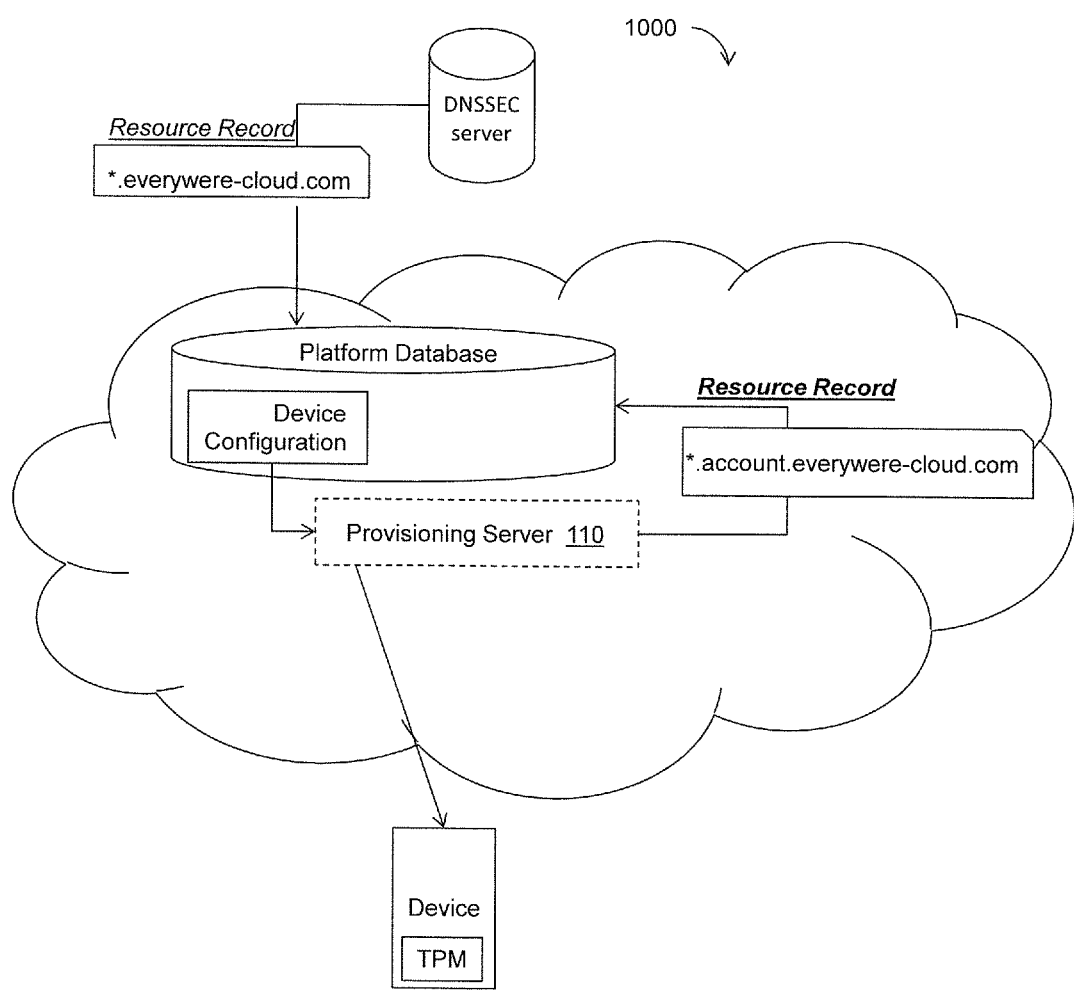
FIG. 11 illustrates the cloud based provisioning system of FIG. 10 during a pre-provisioning phase.

FIG. 11 illustrates one embodiment of a provisioning system that provides network device provisioning to support secure authentication and authorization for networked devices accessing the data collection and processing server 120 (shown in FIG. 10). The system is illustrated as an adaptation of the system 100 illustrate in FIG. 1. The data collection and processing server 120 serves as the messaging broker between the networked devices and the platform database. The device manufacturer and platform provider (DPP) is provided with trusted DNS namespace (e.g., *.everyware-cloud.com). During solution provider (SP) procurement, the DPP platform creates a new account for the SP, i.e. "account". As part of the procurement for a new account, a new Fully Qualified Domain Name for the Solution Provider (SP_FQDN) is seeded under the DPP DNS namespace. By using the DNSSEC infrastructure, the new SP_FQDN will be trusted by the DPP and seeded into the DNS name tree. For example, the DPP registers the SP_FQDN (i.e., *.account.everyware-cloud.com).

The embodiment of the networked device shown in FIG. 11 includes a trusted platform module (TPM). The TPM is a secure, hardware component found in many networked devices that provides cryptographic capabilities to the networked device. For example, the TPM may store private keys and public keys, generate keys for one-time passwords, and so on.

Figure 12:
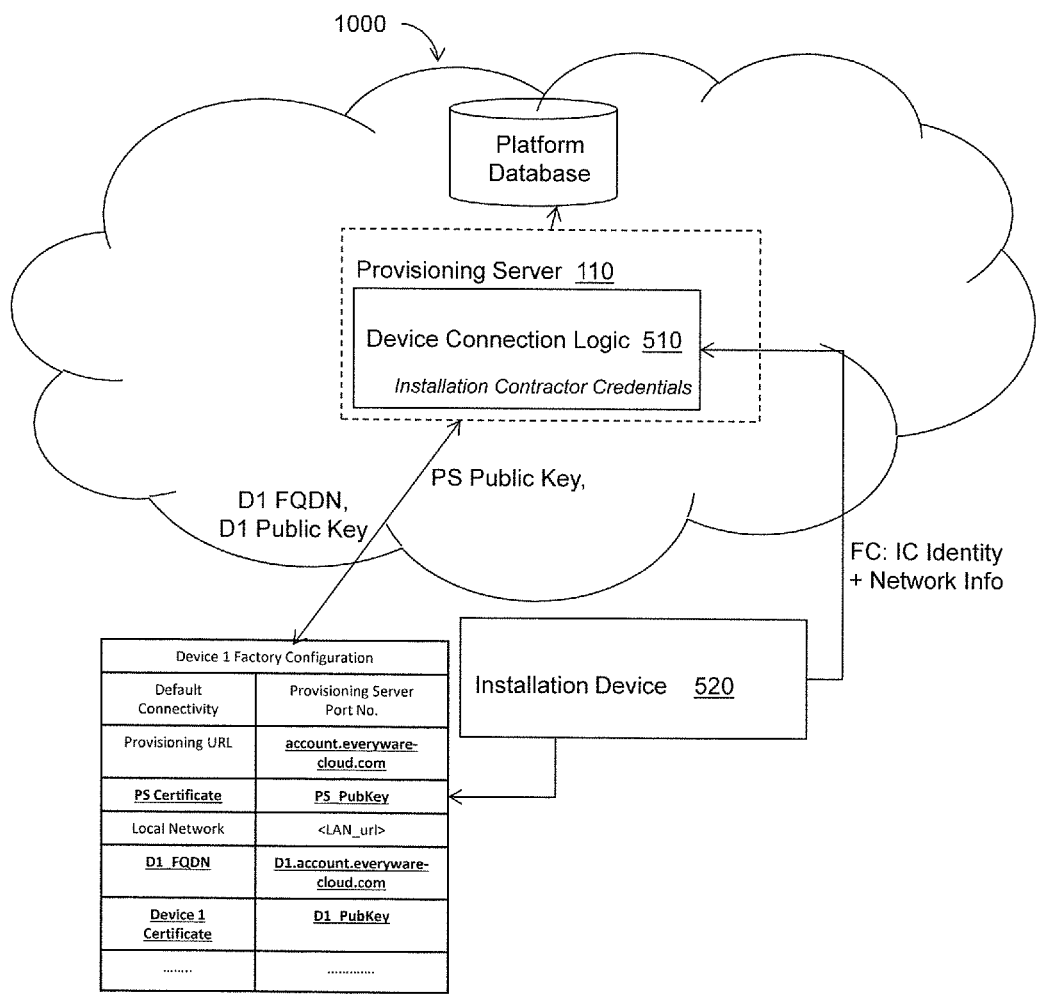
FIG. 12 illustrates the cloud based provisioning system of FIG. 10 during an activation phase.
Figure 13:
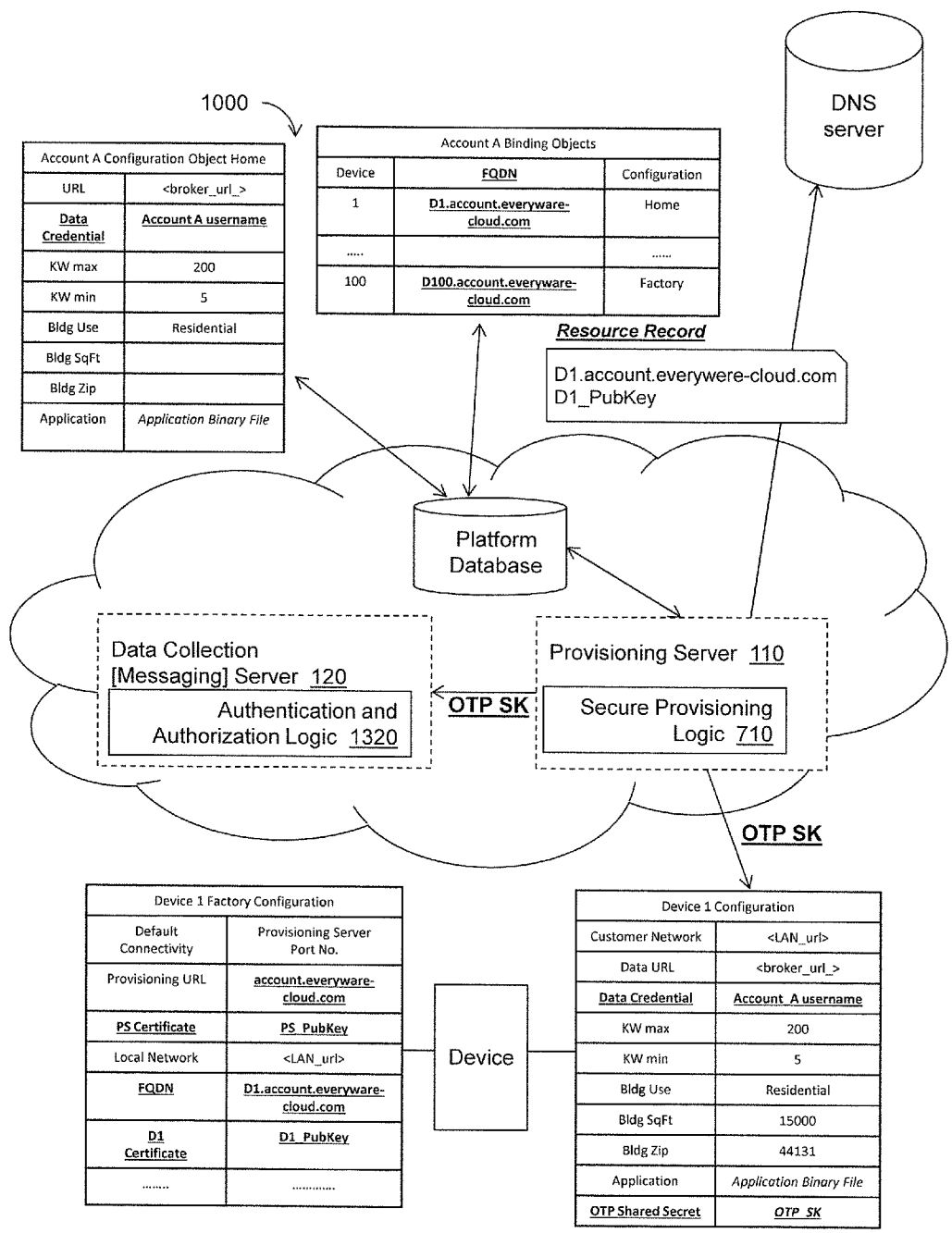
FIG. 13 illustrates the cloud based provisioning system of FIG. 10 during a configuration phase.

FIG. 12 illustrates how the networked device is configured at the device production site. The ND is provided with a unique device identification and a DNSSEC compliant FQDN. For example the FQDN can be computed from the Device_ID and SP_FQDN as Device_ID.SP_FQDN. In the example, using HW MAC Address as Device_ID, the FQDN is computed as B8-6B-23-F6-78-26.account.everyware-cloud.com. In another embodiment the ND's FQDN can be computed differently or it can be altered and synthesized by the ND during the device activation step. In one embodiment, the DN_FQDN is assigned to the ND (computed/activated in the ND when the installation device configures the ND) if not already preset from factory. In one embodiment, the networked device is also configured, at the factory, with a public key for the DPP's provisioning server 110 (i.e. PS PubKey)

FIG. 12 illustrates networked device Device 1 being activated. The trustworthiness of ND Device 1's correct deployment is asserted by the installation contractor inputting the IC credentials and local network information to the Activation Form provided by the device connection logic 510. This entry of IC credentials provides high assurance identification of Device 1 certification to the provisioning server 110 at this early step. The following steps build on this first tier of validation provided by the multi-tier provisioning process. Ultimately, the validation authority is not the IC alone but the combination of the SP and the IC (and the final customer if involved in the provisioning process). Now the ND Device 1 is in "waiting for activation" state.

Upon receipt of the activation request (from the IC operator through the Activation Form on the installation device 520), the device connection logic 510 establishes a trusted connection between Device 1 and the provisioning server 110. In one embodiment, this connection is established by providing the provisioning server's public key to the networked device. In the manner, the networked device trusts the authenticity of the provisioning server once the networked device verifies the PS_PubKey. Device 1 communicates to the provisioning server 110 its FQDN, "D1_FQDN" and its Public Certificate "D1_PubKey."

In one embodiment, the device's Public Certificate can come from the on-board Trusted Platform Module (TPM) hardware module (see FIG. 11). In this way the device identification is tied to the physical hardware resource of the device. In other embodiments, the Device Public Certificate can come from a software key store like the Java KeyStore.

In one embodiment, the device connection logic 510 verifies that a provisioning request is active for the device in its repository. For example, the device connection logic 510 may confirm that there is an unexpired activation key for Device 1 in the platform database, as detailed above with reference to FIG. 3. If no active provisioning request is found for the Device 1, the provisioning process is aborted.

Referring now to FIG. 12, during provisioning the provisioning server 110 registers a new DNSSEC entry Resource Record for Device 1 with a fully qualified name of B8-6B-23-F6-78-26.account.everyware-cloud.com and thus trusting the device identity and the public certificate provided by the device. If case of a registration error, the provisioning server 110 will signal the platform user (the Solution Provider) of the error and the Device 1 will go return to in "waiting for activation" state after a timeout.

The provisioning server 110 sends to Device 1 the configuration and application binary (e.g., an image that records binary values encoding the application for execution by the networked device) over a secure connection. The provisioning server 110 will also send to Device 1 a random generated number OTP_SK that will be used as a shared code (shared secret key) between the data collection server 120 and Device 1 to generate synchronized One Time Passwords (OTP) during the authentication phase. Alternatively the shared code can be generated by Device 1 using its on board hardware like the Trusted Platform Module (TPM) and provided to the provisioning server 110 along with its public certificate (see above). The provisioning server 110 provides OTP_SK to the data collection and processing server 120.

Figure 14:
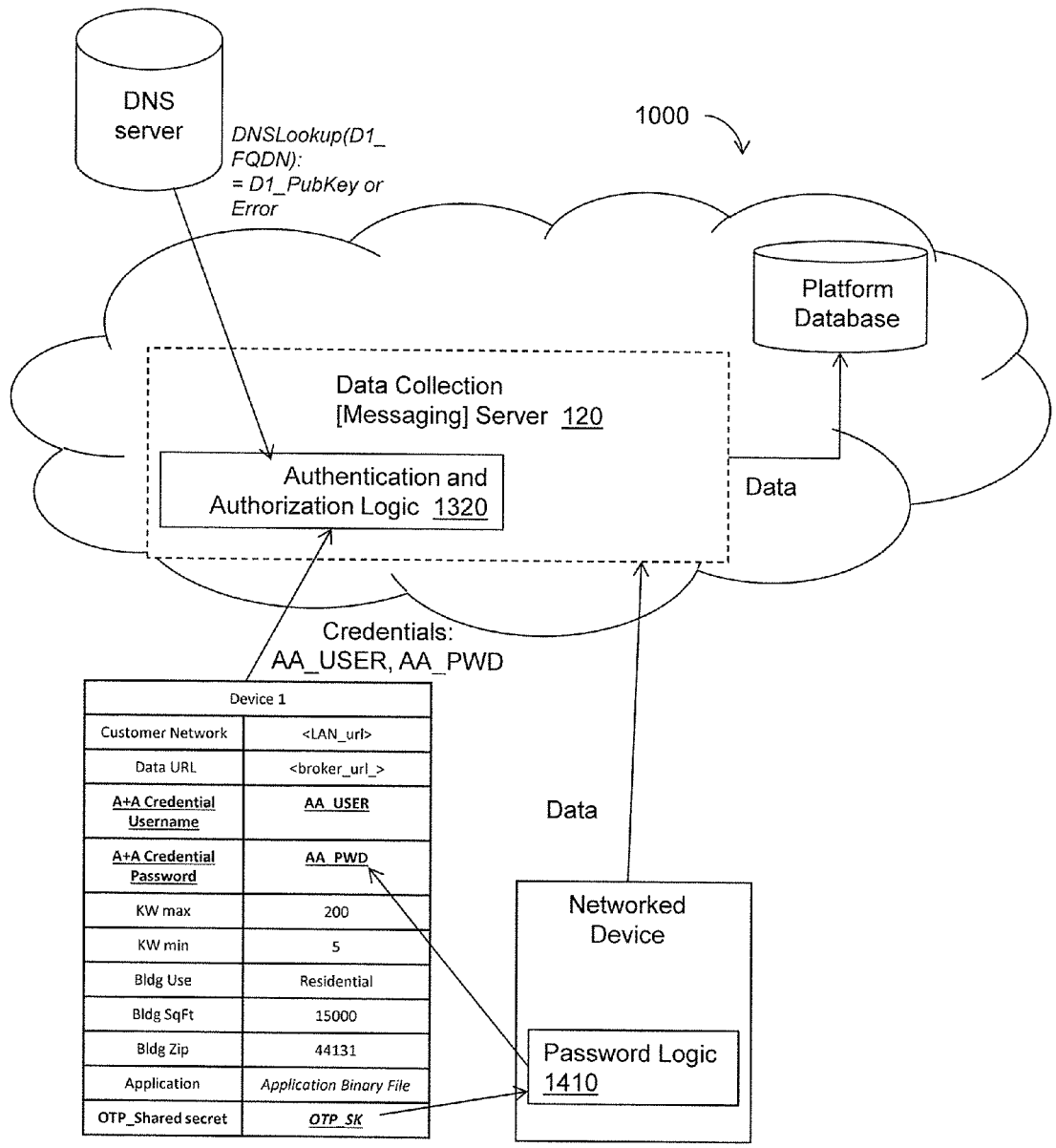
FIG. 14 illustrates the cloud based provisioning system of FIG. 10 during networked device authorization and data reporting.

The provisioning server accesses the binding object for Device 1 in the platform database and transmits the data corresponding to the configuration object bound to Device 1 to Device 1. As described above with reference to FIGS. 1-9, the configuration data is transmitted directly to the networked device by way of the network connection between the provisioning server 110 and the networked device. The configuration data is not exposed to the installation device 510, which is not part of the network connection between the provisioning server 110 and the networked device. Device 1 is informed that it is enabled for DNSSEC based authentication and it will use this information to push the appropriate credentials to the data collection and processing server during connect. Device 1 verifies the provided configuration data and applies the configuration, including time synchronization information for the networked device with the IoT platform and in particular with the data collection and processing server 120. Device 1 disconnects from the provisioning server and then starts the provisioned customer application and configuration FIG. 14 provides an overview of the authentication and authorization that is performed when a networked device accesses the data collection and processing server 120. This step is required every time a network device enabled for DNSSEC authentication needs to communicate with the data collection and processing server, for example to upload a new recorded data. Device 1 computes the credentials (e.g., AA_USER and AA_PWD) to authenticate on the data collection and processing server 120. It is assumed that the Device 1 will connect to the data collection and processing server 120 over a communication protocol which can only provide standard ACL-based username and password credentials. The following scheme transports DNSSEC-based information over username and password fields for the device authorization and authentication.

In one embodiment the data collection and processing server 120 includes authentication and authorization logic 1320. The authentication and authorization logic implements an authentication and authorization method to decode the username/password credential suitable for providing to a legacy ACL-based access module. The credential username combines (i.e., AA_USER) the username passed to the device during provisioning and the device D1_FQDN. For example, the credential username could be computed from the data collection and processing server's ACL-based credential username. In the example, the credential username is the username for the Account A, referred to herein as UserA. An exemplary credential username can be defined as AA_USER=UserA.D1_FQDN. The data collection and processing server 120 will use the device D1_FQDN for authentication and the username for authorization—determining the ACLs to grant to this device connection.

The networked device includes password logic 1410 that generates a credential password to authenticate with the data collection and processing server 120. In one embodiment, the credential password is generated using a Device 1 specific one-time password (OTP) generation function Random_Key(time_sync) that is valid for a fixed amount of time. In another embodiment, the OTP is computed based on the current time and an OTP shared secret "OTP_SK" provided to the networked device and the data collection and processing server 120 during provisioning. In particular it has been found to be effective to use a time-synchronized OTP to enable the data collection and processing server 120 to perform authentication over a specified time window (commonly in the range of 30 to 120 sec.).

In another embodiment, a time based one-time password (TOTP) can be used with the OTP_SK as secret shared key, using a generation function OTP_Key1=Random_Key (time_sync, OTP_SK). The credential password AA_PWD is then computed by the networked device using at least the device's FQDN and the OTP_Key1. The password could also include the account username. For example the clear password (CPWD) for the example is UserA.D1_FQDN.OTP_Key1. The clear password is then signed and encrypted using the Device 1 Private Key certificate, D1_PrivKey to produce a hashed or signed password (HPWD). In one embodiment, the encryption of such information is assisted by hardware protected cryptography functions provided by the on board Trusted Platform Module (TPM). Thus, HPWD=Sign(CPWD, D1_PrivKey), PWD=CPWD.HPWD and so AA_PWD=Encrypt(PWD, D1_PrivKey).

The remaining steps are completed during the OTP Sync window. Device 1 connects to the Data Collection and Processing Server provides the credentials (i.e., AA_USER, AA_PWD) to the authentication and authorization logic 1320. The authentication and authorization logic 720 authenticates and authorizes Device 1's connection as follows. The authentication and authorization logic 1320 extracts D1_FQDN from AA_USER (knowing the AA_USER static composition). In the example: D1_FQDN=Tail(AA_USER). The authentication and authorization logic 1320 performs a DNS Lookup to retrieve trusted information about D1: DNSLookup(D1_FQDN) =D1_PubKey. If D1 is untrusted (for any reason), (i.e. it's not in the DNSSEC database), the authentication and authorization logic 1320 will not enable a connection between D1 and the data collection and processing server 120. The error will be signaled to the IoT Platform. A certificate revocation policy will be used to remove D1's DNSSEC registration record (for example after a number of negative authentication) from the DNS database.

To verify the password, the authentication and authorization logic 1320 computes an OTP random Key using the same Random_Key( ) function available at Device 1 (and within the valid time window): OTP_KEY2=Random_Key (time sync, OTP_SK). The authentication and authorization logic 1320 decrypts the AA_PWD, verifies the signature, extracts the embedded OTP information and compares the OTP with the locally computed OTP. Referring to the example, the decrypted password DPWD can be computed as DPWD=Decrypt(AA_PWD, D1_PubKey). The authentication and authorization logic 1320 compares hashes to verify password integrity: CPWD=Head(DPWD) and HPWD=Tail(DPWD) against locally re-calculated HPWD2=Sign(CPWD, D1_PubKey). The authentication and authorization logic 1320 extracts the OTP from CPWD. In particular with the current example having AA_USER=UserA.D1_FQDN and the original clear password CPWD: CPWD=UserA.D1_FQDN.OTP_Key1=AA_USER.OTP_Key1. The original OTP key can be directly extracted from CPWD by removing AA_USER from the string head OTP_Key1=Tail_Substring(CPWD, AA_USER).

The authentication and authorization logic 1320 compares (OTP_Key1, OTP_Key2). A match indicates that the password has been verified and thus authenticates Device 1. In response, the authentication and authorization logic 1320 provides the extracted ACL-based username and an ACL-based password for standard ACL-based authorization to the data collection and processing server 120. In one embodiment the ACL-based password has been statically predefined in the system. In another embodiment there is no ACL-based password at all. In the first case, for example: Data Collection Server_Username=Head(AA_USER) =UserA. The password can be defined as Data Collection Server_Pwd=D1_FQDN. This allows Device 1 access to the data collection and processing server and the data collection and processing server will apply the appropriate ACLs based on the predefined authorization policies.

Figure 15:
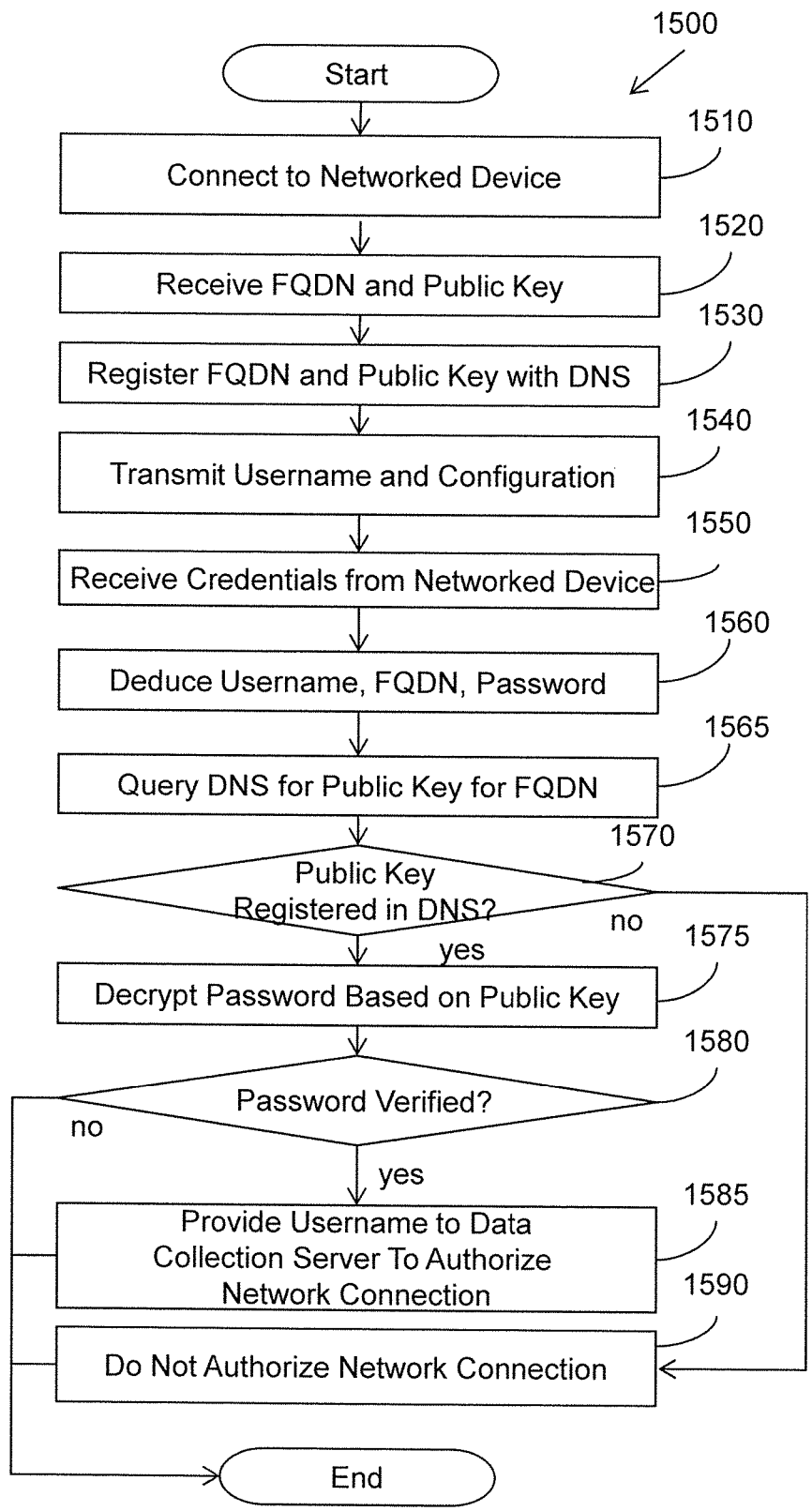
FIG. 15 illustrates one embodiment of a method of provisioning a networked device to support authentication and authorization during data reporting and authorizing and authenticating a networked device for connection to a data collection server for data reporting.

FIG. 15 illustrates one embodiment of a method 1500 for provisioning a networked device to enable and support authenticated access by the networked device to a data collection and processing server. At 1510, a network connection is established with the networked device. At 1520, a fully qualified domain name and a public key for the networked device are received from the networked device. At 1530, the fully qualified domain name and the public key are registered with a domain name server (DNS). 1540, configuration data, including data corresponding to a username, is transmitted to the networked device. The username enables the networked device to establish an authorized connection with a data collection server that is accessible, via a network, to the networked device. The networked device is now provisioned and ready to periodically connect to a data collection and processing server to download collected data. Steps 1510-1540 may be performed by a cloud-based provisioning server, like server 110, as described above with reference to FIGS. 1-14.

At 1550, credentials are received from the networked device. At 1560, the username, the fully qualified domain name, and an encrypted password are deduced from the credentials. At 1565, the domain name server is queried. The DNS stores records mapping fully qualified device names to public keys for respective networked devices. At 1570 a determination is made as to whether the public key is received from the domain name server. When a public key for the device is returned by the domain name server, at 1575, the password is decrypted based, at least in part, on the public key. At 1580, an attempt is made to verify the password and if the password is verified, at 1585 the username is provided to a data collection server to authorize a network connection between the computing device and the data collection server. When the domain name server does not have a record recording a public key for the fully qualified domain name at 1570 or the password is not verified at 1580, a connection between the networked device and the data collection server is not authorized at 1590. Steps 1550-1590 may be performed by a cloud-based data collection and processing server, like server 120, as described above with reference to FIGS. 1-14.

It can be seen that the secure provisioning systems and methods described with reference to FIGS. 10-15 include certain adaptations to components as described in FIGS. 1-9. For example, the provisioning 110 includes a DNSSEC record registration capability (API). The data collection and processing server 120 includes provisioning for time-synchronized one-time password generation, DNS Lookup on DNSSEC records capability, and authentication and authorization logic 1320 to provide the original ACL-based data collection and processing server 120 with a decoded username/password for legacy authentication method compatibility. The networked device is provided with TPM hardware module or other hardware and software components (i.e. for self-signed certification) to make available cryptographic keys related to the specific device and hardware/software provisioning for time-synchronized one-time password (OTP) generation. The TPM can be used for this purpose.

In one embodiment, the method 1500 includes generating a shared secret key and transmitting the shared secret key to i) the networked device and ii) the data collection server. The shared secret key enables the networked device to establish an authenticated connection with the data collection server.

In one embodiment, the method 1500 includes establishing an authenticated connection with the networked device by transmitting a public key for the computing device to the networked device.

In one embodiment, the method 1500 includes accessing data corresponding to requests for provisioning for respective computing devices and when there is no request for provisioning for the computing device, refraining from transmitting the configuration data to the networked device.

In one embodiment, the method 1500 includes receiving, from an installation device that is different than the networked device, a request to activate the networked device; and in response to the request, establishing the network connection with the networked device such that the installation device does not receive data transmitted via the network connection.

In one embodiment, the method 1500 includes generating the shared secret by generating a random number. In one embodiment, the method 1500 includes receiving the shared secret from the networked device.

In one embodiment, the method 1500 includes deducing the fully qualified device name as a predetermined portion of the credentials, where the fully qualified domain name uniquely identifies the networked device.

In one embodiment, the method 1500 includes attempting to verify the decrypted password by: extracting a first secret key from the decrypted password; accessing memory storing respective secret keys mapped to respective networked devices; selecting from the memory a second secret key corresponding to a shared secret key mapped to the networked device; comparing the first secret key to the second secret key; and when the first secret key matches the second secret key, determining that the decrypted password is verified.

In one embodiment, the method 1500 includes attempting to verify the password by: receiving, with the encrypted password, a signature computed by the networked device using a private key of the networked device and the password; attempt to verify the signature based on the public key; and when the signature verifies based on the public key, determining that the decrypted password is verified.

In one embodiment, the method 1500 includes, when the domain name server does not have a public key for the fully qualified domain name, invoking a certificate revocation policy to revoke a record associated with the fully qualified device name from the domain name server.

In one embodiment of the method 1500 the querying of the domain name server, the registering of the fully qualified domain name and the public key, and the receiving of the public key are performed in accordance with DNSSEC protocol.

Computer Embodiment

Figure 16:
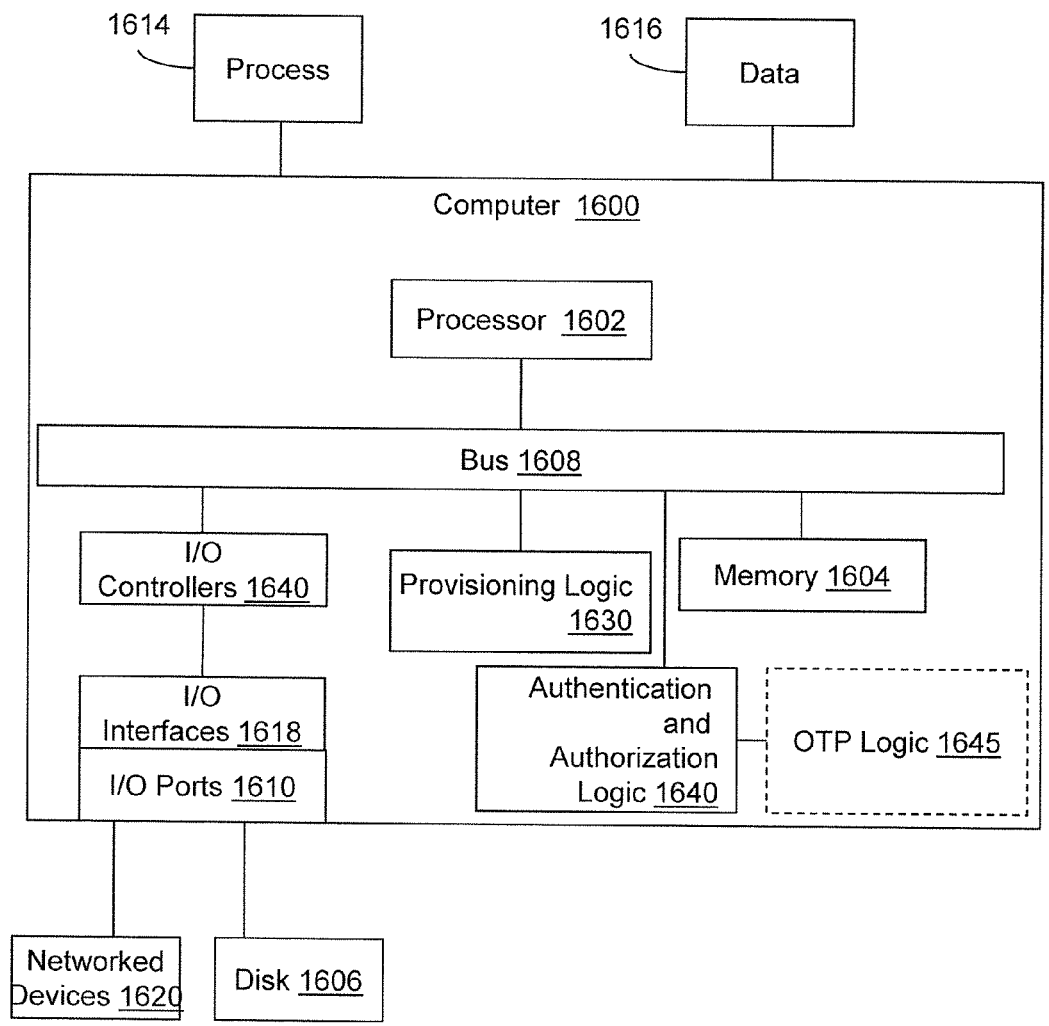
FIG. 16 illustrates an embodiment of a computing system configured with the example systems and/or methods disclosed.

FIG. 16 illustrates an example computing device that is configured and/or programmed with one or more of the example systems and methods described herein, and/or equivalents. The example computing device may be a computer 1600 that includes a processor 1602, a memory 1604, and input/output ports 1610 operably connected by a bus 1608. The computing device 1600 may be the provisioning server 110 and/or the data collection and processing server 120 of FIGS. 1-16. In one example, the computer 1600 may include provisioning logic 1630 configured to facilitate secure multi-tier provisioning. The provisioning logic 1630 may include any or all of the logics depicted in FIGS. 1-16. In different examples, the provisioning logic 1630 may be implemented in hardware, a non-transitory computer storage medium with stored instructions, firmware, and/or combinations thereof. While the provisioning logic 1630 is illustrated as a hardware component attached to the bus 1608, it is to be appreciated that in one example, the provisioning logic 1630 could be implemented in the processor 1602.

In one embodiment, the computer 1600 is a data collection and processing server and includes authentication and authorization logic 1640 configured to facilitate authentication and authorization of a networked device attempting to access a data collection and processing server. The authentication and authorization logic 1640 may include any or all of the logics depicted in FIGS. 1-16. In different examples, the authentication and authorization logic 1640 may be implemented in hardware, a non-transitory computer storage medium with stored instructions, firmware, and/or combinations thereof. While the authentication and authorization logic 1640 is illustrated as a hardware component attached to the bus 1608, it is to be appreciated that in one example, the authentication and authorization logic 1640 could be implemented in the processor 1602.

In one embodiment, the provisioning logic 1630 or the computer is a means (e.g., hardware, non-transitory computer storage medium, firmware) for secure cloud based multi-tier provisioning. The means may be implemented, for example, as an ASIC programmed to securely provision and collect data from networked devices. The means may also be implemented as stored computer executable instructions that are presented to computer 1600 as data 1616 that are temporarily stored in memory 1604 and then executed by processor 1602.

In one example, the computer 1600 may include one-time password (OTP) logic 1645 configured to generate one-time passwords according to a shared secret with a networked device and a provisioning server. The one-time password (OTP) logic 1645 may include any or all of the logics depicted in FIGS. 1-15. In different examples, the one-time password (OTP) logic 1645 may be implemented in hardware, a non-transitory computer storage medium with stored instructions, firmware, and/or combinations thereof. While the one-time password (OTP) logic 1645 is illustrated as a hardware component attached to the bus 1608, it is to be appreciated that in one example, the one-time password (OTP) logic 1645 could be implemented in the processor 1602.

In one embodiment, one-time password (OTP) logic 1645 or the computer is a means (e.g., hardware, non-transitory computer storage medium, firmware) for generating one-time passwords according to a shared secret with a networked device and a provisioning server. The means may be implemented, for example, as an ASIC programmed to generate one-time passwords according to a shared secret with a networked device and a provisioning server. The means may also be implemented as stored computer executable instructions that are presented to computer 1600 as data 1616 that are temporarily stored in memory 1604 and then executed by processor 1602.

Generally describing an example configuration of the computer 1600, the processor 1602 may be a variety of various processors including dual microprocessor and other multi-processor architectures. A memory 1604 may include volatile memory and/or non-volatile memory. Non-volatile memory may include, for example, ROM, PROM, and so on. Volatile memory may include, for example, RAM, SRAM, DRAM, and so on.

A storage disk 1606 may be operably connected to the computer 1600 via, for example, an input/output interface (e.g., card, device) 1618 and an input/output port 1610. The disk 1606 may be, for example, a magnetic disk drive, a solid state disk drive, a floppy disk drive, a tape drive, a Zip drive, a flash memory card, a memory stick, and so on. Furthermore, the disk 1606 may be a CD-ROM drive, a CD-R drive, a CD-RW drive, a DVD ROM, and so on. The memory 1604 can store a process 1614 and/or a data 1616, for example. The disk 1606 and/or the memory 1604 can store an operating system that controls and allocates resources of the computer 1600.

The computer 1600 may interact with input/output devices via the i/o interfaces 1618 and the input/output ports 1610. Input/output devices may be, for example, a keyboard, a microphone, a pointing and selection device, cameras, video cards, displays, the disk 1606, the networked devices 1620, and so on. The input/output ports 1610 may include, for example, serial ports, parallel ports, and USB ports.

The computer 1600 can operate in a network environment and thus may be connected to the networked devices 1620 via the i/o interfaces 1618, and/or the i/o ports 1610. Through the networked devices 1620, the computer 1600 may interact with a network. Through the network, the computer 1600 may be logically connected to remote computers. Networks with which the computer 1600 may interact include, but are not limited to, a LAN, a WAN, and other networks.

In another embodiment, the described methods and/or their equivalents may be implemented with computer executable instructions. Thus, in one embodiment, a non-transitory computer storage medium is configured with stored computer executable instructions that when executed by a machine (e.g., processor, computer, and so on) cause the machine (and/or associated components) to perform the methods and processes described with reference to FIGS. 1-15.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C §101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium", as used herein, is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage media may include, but are not limited to, a floppy disk, a flexible disk, a hard disk, a magnetic tape, other magnetic medium, an ASIC, a CD, other optical medium, a RAM, a ROM, a memory chip or card, a memory stick, and other electronic media that can store computer instructions and/or data. Computer storage media described herein are limited to statutory subject matter under 35 U.S.C §101.

"Logic", as used herein, includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter under 35 U.S.C §101.

"Entity", as used herein, includes but is not limited to one or more persons, computers or other devices, or combinations of these.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this disclosure is intended to embrace alterations, modifications, and variations that fall within the scope of the appended claims, which satisfy the statutory subject matter requirements of 35 U.S.C. §101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A method, comprising:
   with a provisioning server:
   establishing a network connection with a networked device;
   receiving, from the networked device, a fully qualified domain name and a public key for the networked device;
   registering the fully qualified domain name and the public key with a domain name server that stores records mapping fully qualified device names to public keys for respective networked devices; and
   transmitting configuration data, including data corresponding to a username, to the networked device, where the username enables the networked device to establish an authorized connection with a data collection server that is accessible, via a network, to the networked device;
   with the data collection server, in response to receiving credentials from the networked device:
   deducing, from the credentials, the username, the fully qualified domain name for the networked device, and an encrypted password, where the encrypted password was computed by the networked device using a private key of the networked device;
   querying the domain name server for the public key mapped to the fully qualified domain name;
   receiving, from the domain name server, the public key mapped to the fully qualified domain name;
   decrypting the encrypted password based, at least in part, on the public key;
   attempting to verify the decrypted password;
   when the public key for the networked device is returned by the domain name server and the decrypted password is verified, providing the username to the data collection server to authorize a network connection between the networked device and the data collection server; and
   when the domain name server does not have a record recording the public key for the fully qualified domain name or the decrypted password is not verified, refraining from providing the username to the data collection server.

2. The method of claim 1, further comprising, with the provisioning server:
   generating a shared secret key; and
   transmitting the shared secret key to i) the networked device and ii) the data collection server, where the shared secret key enables the networked device to establish an authenticated connection with the data collection server.

3. The method of claim 1, further comprising, with the provisioning server, establishing an authenticated connection with the networked device by transmitting a public key for the provisioning server to the networked device.

4. The method of claim 1, further comprising, with the provisioning server:
   accessing data corresponding to requests for provisioning for respective networked devices, where the requests for provisioning are received from a solution provider;
   when there is no request for provisioning for the networked device, refraining from transmitting the configuration data to the networked device.

5. The method of claim 1, further comprising, with the provisioning server:
   receiving, from an installation device that is different than the networked device, a request to activate the networked device; and
   in response to the request, establishing the network connection with the networked device such that the installation device does not receive data transmitted via the network connection.

6. The method of claim 1, further comprising, with the provisioning server, generating a shared secret by generating a random number.

7. The method of claim 1, further comprising, with the data collection server, receiving a shared secret from the networked device.

8. The method of claim 1, further comprising, with the data collection server, deducing the fully qualified device name as a predetermined portion of the credentials, where the fully qualified domain name uniquely identifies the networked device.

9. The method of claim 1, further comprising, with the data collection server, attempting to verify the decrypted password by:
   extracting a first secret key from the decrypted password;
   accessing memory storing respective secret keys mapped to respective networked devices;
   selecting from the memory a second secret key corresponding to a shared secret key mapped to the networked device;
   comparing the first secret key to the second secret key; and
   when the first secret key matches the second secret key, determining that the decrypted password is verified.

10. The method of claim 9 where the decrypted password is one time password that is considered valid for a limited duration of time.

11. The method of claim 1, further comprising, with the data collection server, attempting to verify the decrypted password by:
receiving, with the encrypted password, a signature computed by the networked device using the private key of the networked device;
attempt to verify the signature based on the public key; and
when the signature verifies based on the public key, determining that the decrypted password is verified.

12. The method of claim 1, further comprising, with the data collection server, when the domain name server does not have the public key for the fully qualified domain name, invoking a certificate revocation policy to revoke a record associated with the fully qualified device name from the domain name server.

13. The method of claim 1, wherein the querying of the domain name server, the registering of the fully qualified domain name and the public key, and the receiving of the public key are performed in accordance with DNSSEC protocol.

14. A computing system, comprising:
a provisioning server comprising configuration logic configured to:
establish a network connection with a networked device;
receive, from the networked device, a fully qualified domain name and a public key for the networked device;
register the fully qualified domain name and the public key with a domain name server that stores records mapping fully qualified device names to public keys for respective networked devices; and
transmit configuration data, including data corresponding to a username, to the networked device, where the username enables the networked device to establish an authorized connection with a data collection server that is accessible, via a network, to the networked device; and
the data collection server comprising authentication and authorization logic configured to, in response to receiving credentials from the networked device:
deduce, from the credentials, the username, the fully qualified domain name, and an encrypted password, where the encrypted password was computed by the networked device using a private key of the networked device;
query the domain name server for the public key mapped to the fully qualified domain name;
when the domain name server does not have a record recording the public key for the fully qualified domain name, refraining from providing the username to the data collection server such that no network connection will be established between the networked device and data collection server;
when the public key for the device is returned by the domain name server: decrypt the encrypted password, based at least in part, on the public key;
attempt to verify the decrypted password;
when the decrypted password is verified, provide the username to the data collection server to authorize a network connection between the networked device and the data collection server.

15. The computing system of claim 14, where the configuration logic is further configured to:
generate a shared secret key; and
transmit the shared secret key to i) the networked device and ii) the data collection server, where the shared secret key enables the networked device to establish an authenticated connection with the data collection server.

16. The computing system of claim 14, where the configuration logic is further configured to establish an authenticated connection with the networked device by transmitting a public key for the provisioning server to the networked device.

17. The computing system of claim 14, where the configuration logic is further configured to:
access data corresponding to requests for provisioning for respective networked devices, where the requests for provisioning are received from a solution provider;
when there is no request for provisioning for the networked device, refrain from transmitting the configuration data to the networked device.

18. The computing system of claim 14, where the authentication and authorization logic is further configured to attempt to verify the encrypted password by:
extracting a first secret key from the decrypted password;
accessing memory storing respective secret keys mapped to respective networked devices;
selecting from the memory a second secret key corresponding to a shared secret key mapped to the networked device;
comparing the first secret key to the second secret key; and
when the first secret key matches the second secret key, determining that the decrypted password is verified.

19. The computing system of claim 18, where the authentication and authorization logic is further configured to attempt to verify the decrypted password by:
receiving, with the encrypted password, a signature computed by the networked device using the private key of the networked device;
attempting to verify the signature based on the public key; and
when the signature verifies based on the public key, determining that the decrypted password is verified.

20. The computing system of claim 14, where the decrypted password is one time password that is considered valid for a limited duration of time.

* * * * *